(12) United States Patent
Feng et al.

(10) Patent No.: US 11,631,394 B2
(45) Date of Patent: Apr. 18, 2023

(54) SYSTEM AND METHOD FOR DETERMINING OCCUPANCY

(71) Applicant: Robert Bosch GmbH, Stuttgart (DE)

(72) Inventors: Zhe Feng, Mountain View, CA (US); Attila Reiss, Rutesheim (DE); Shabnam Ghaffarzadegan, San Mateo, CA (US); Mirko Ruhs, Heppenheim (DE); Robert Duerichen, Oxford (GB)

(73) Assignee: Robert Bosch GmbH, Stuttgart (DE)

( * ) Notice: Subject to any disclaimer, the term of this patent is extended or adjusted under 35 U.S.C. 154(b) by 108 days.

(21) Appl. No.: 16/756,923

(22) PCT Filed: Dec. 14, 2018

(86) PCT No.: PCT/EP2018/084962
§ 371 (c)(1),
(2) Date: Apr. 17, 2020

(87) PCT Pub. No.: WO2019/121397
PCT Pub. Date: Jun. 27, 2019

(65) Prior Publication Data
US 2021/0201889 A1    Jul. 1, 2021

Related U.S. Application Data

(60) Provisional application No. 62/609,488, filed on Dec. 22, 2017.

(51) Int. Cl.
*G10L 15/02* (2006.01)
*G10L 15/20* (2006.01)
*G10L 25/51* (2013.01)

(52) U.S. Cl.
CPC .............. *G10L 15/02* (2013.01); *G10L 15/20* (2013.01); *G10L 25/51* (2013.01)

(58) Field of Classification Search
CPC ......... G10L 15/02; G10L 15/20; G10L 25/51; G08B 13/1672
See application file for complete search history.

(56) References Cited

U.S. PATENT DOCUMENTS

2014/0056432 A1   2/2014   Loui et al.
2014/0122381 A1*  5/2014   Nowozin ............... G06N 20/00
                                                706/12

(Continued)

FOREIGN PATENT DOCUMENTS

WO   2016/172363 A1   10/2016
WO   2017/149324 A1    9/2017

OTHER PUBLICATIONS

L. Rutkowski, M. Jaworski, L. Pietruczuk and P. Duda, "A New Method for Data Stream Mining Based on the Misclassification Error," in IEEE Transactions on Neural Networks and Learning Systems, vol. 26, No. 5, pp. 1048-1059, May 2015, doi: 10.1109/TNNLS.2014.2333557 (Year: 2015).*

(Continued)

*Primary Examiner* — Bhavesh M Mehta
*Assistant Examiner* — Nandini Subramani
(74) *Attorney, Agent, or Firm* — Maginot, Moore & Beck LLP

(57) ABSTRACT

A method of detecting occupancy in an area includes obtaining, with a processor, an audio sample from an audio sensor and determining, with the processor, feature functional values of a set of selected feature functionals from the audio sample. The determining of the feature functional values includes extracting features in the set of selected feature functionals from the audio sample, and determining the feature functional values of the set of selected features from the extracted features. The method further includes deter- (Continued)

mining, with the processor, occupancy in the area using a classifier based on the determined feature functional values.

17 Claims, 18 Drawing Sheets

(56) References Cited

U.S. PATENT DOCUMENTS

| | | | |
|---|---|---|---|
| 2014/0220883 | A1 | 8/2014 | Emigh et al. |
| 2015/0380013 | A1* | 12/2015 | Nongpiur ................ G10L 25/51 704/231 |
| 2016/0162844 | A1* | 6/2016 | Rachuri ............. G06Q 10/1095 705/7.19 |
| 2016/0335488 | A1* | 11/2016 | Nongpiur ................ G10L 25/18 |

OTHER PUBLICATIONS

I. McCowan, D. Dean, M. McLaren, R. Vogt and S. Sridharan, "The Delta-Phase Spectrum With Application to Voice Activity Detection and Speaker Recognition," in IEEE Transactions on Audio, Speech, and Language Processing, vol. 19, No. 7, pp. 2026-2038, Sep. 2011, doi: 10.1109/TASL.2011.2109379 (Year: 2011).*
S. Wegener, M. Haller, J. J. Burred, T. Sikora, S. Essid and G. Richard, "On the robustness of audio features for musical instrument classification," 2008 16th European Signal Processing Conference, 2008, pp. 1-5. (Year: 2008).*
Huang, Q., Ge, Z., & Lu, C. (2016). Occupancy estimation in smart buildings using audio-processing techniques. arXiv preprint arXiv: 1602.08507. (Year: 2016).*
L. Rutkowski, M. Jaworski, L. Pietruczuk and P. Duda, "A New Method for Data Stream Mining Based on the Misclassification Error," in IEEE Transactions on Neural Networks and Learning Systems, vol. 26, No. 5, pp. 1048-1059, May 2015 (Year: 2015).*
Syty, Mikalai, Master's Thesis: Analysis and fusion of ubiquitous sensors for presence detection and people count, Sep. 26, 2016, Darmstadt University of Applied Sciences (121 pages).
International Search Report corresponding to PCT Application No. PCT/EP2018/084962, dated Mar. 27, 2019 (3 pages).
Agarwal, Y. et al., "Occupancy-Driven Energy Management for Smart Building Automation," Proc. 2nd ACM Work. Embed. Sens. Syst. Energy-Efficiency Build, BuildSys'10, Nov. 2, 2010 (6 pages).
Bahl, P. et al., "RADAR: An In-Building RF-based User Location and Tracking System," IEEE Infocom, 2000, pp. 775-784 (10 pages).
Basu, C. et al., "PerCCS: person-count from carbon dioxide using sparse non-negative matrix factorization," Proc. 2015 ACM Int. Jt. Conf. Pervasive Ubiquitous Comput. 2015, Sep. 7, 2015, pp. 987-998 (12 pages).
Beltran, A. et al., "ThermoSense: Occupancy Thermal Based Sensing for HVAC Control," Proc. 5th ACM Work. Embed. System. Energy-Efficient Build., Buildsys'13, Nov. 13, 2013 (8 pages).
Guyon, I. et al., "An introduction to variable and feature selection," Journal of Machine Learning Research, vol. 3, Mar. 2003, pp. 1157-1182 (26 pages).
Hevesi, P. et al., "Monitoring household activities and user location with a cheap, unobtrusive thermal sensor array," Proc. 2014 ACM Int. Jt. Conf. Pervasive Ubiquitous Comput., UbiComp'14, Sep. 13, 2014, pp. 141-145 (5 pages).
Khan, A. et al.," Occupancy Monitoring using Environmental & Context Sensors and a Hierarchical Analysis Framework," Proceedings of the 1st ACM Conference on Embedded Systems for Energy-Efficient Buildings, BuildSys'14, Nov. 5, 2014 (10 pages).
Lam, K. P. et al., "Occupancy Detection Through an Extensive Environmental Sensor Network in an Open-Plan Office Building," 11th International IBPSA Conference, Jul. 27, 2009, pp. 1452-1459 (8 pages).
Lam, K. P. et al., "Information-Theoretic Environmental Features Selection for Occupancy Detection in Open Offices," 11th International IBPSA Conference, Jul. 27, 2009, pp. 1460-1467 (8 pages).
Tarzia, S. P. et al., "Sonar-based Measurement of User Presence and Attention," Proc. Intl. Conf. Ubiquitous Comput., UbiComp 2009, Sep. 30, 2009, pp. 89-92 (4 pages).
Tibshirani, R., "Regression Shrinkage and Selection via the Lasso," J. R. Statist. Soc. B, 1996, vol. 58, No. 1, pp. 267-288 (22 pages).
Pakhomov, A. et al., "Seismic Footstep Signal Characterization," Proc. SPIE 5071, Sensors, and Command, Control, Communications, and Intelligence (C3I) Technologies for Homeland Defense and Law Enforcement II, pp. 297-305, 2003 (9 pages).
Uziel, S. et al., "Networked Embedded Acoustic Processing System for Smart Building Applications," Conference on Design and Architectures for Signal and Image Processing, Oct. 8, 2013 (2 pages).
Liu, H. et al., "Chi2: Feature Selection and Discretization of Numeric Attributes," Proc. 7th IEEE International Conference on Tools with Artificial Intelligence, pp. 388-391, 1995 (4 pages).

* cited by examiner

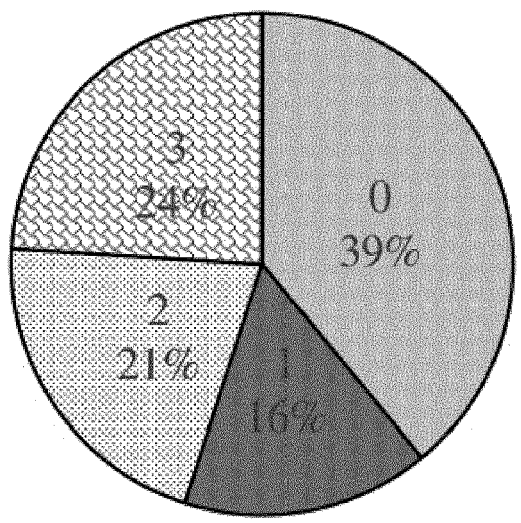
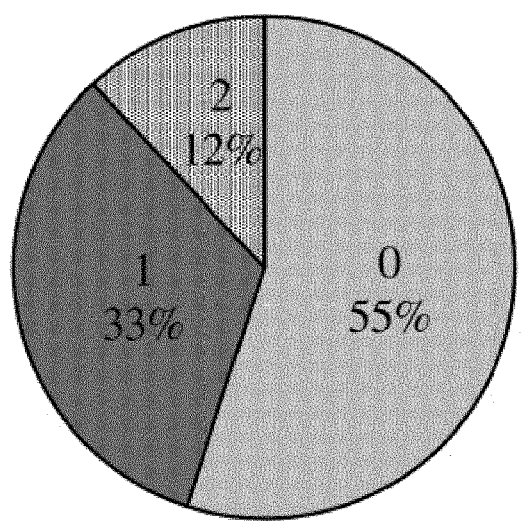
Fig. 5A  Fig. 5B
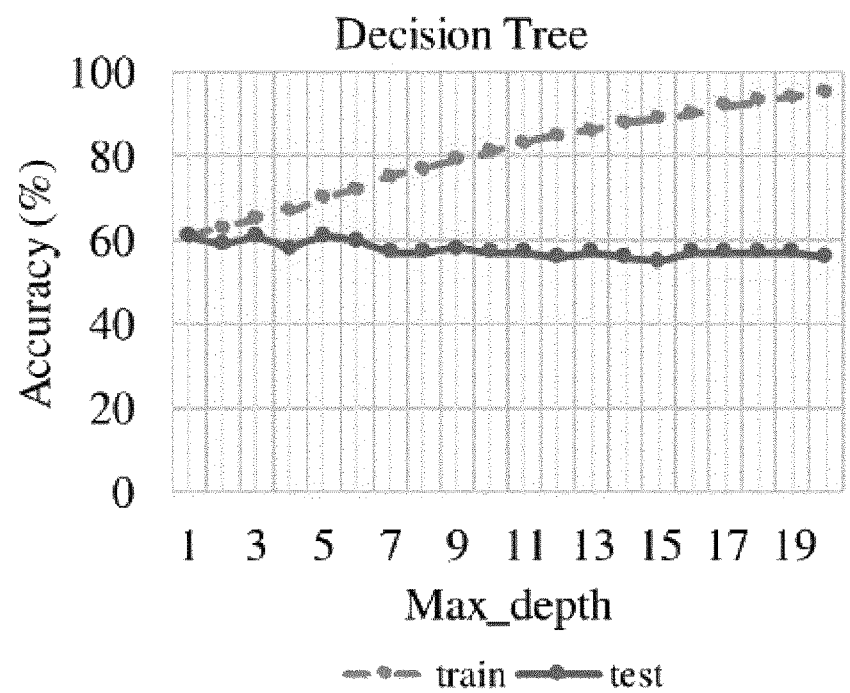
Fig. 6

SYSTEM AND METHOD FOR DETERMINING OCCUPANCY

CLAIM OF PRIORITY

This application is a 35 U.S.C. § 371 National Stage Application of PCT/EP2018/084962, filed on Dec. 14, 2018, which claims priority to U.S. Provisional Application Ser. No. 62/609,488 entitled "System and Method for Determining Occupancy" filed Dec. 22, 2017, the disclosure of which is incorporated herein by reference in its entirety.

TECHNICAL FIELD

This disclosure relates generally to occupancy detection, and more particular to determining occupancy via an audio signal.

BACKGROUND

Occupancy detection, including presence detection and detection of the number of people occupying a space (also referred to herein as "head counting"), is an important function in smart homes and buildings. In particular, occupancy detection enables efficiency improvements in smart heating, ventilation and air conditioning (HVAC) systems, improved smart evacuation in emergency situations, discovering intruders or abnormal patterns of occupants' behaviors for security systems, and other improvements.

Some conventional occupancy detection systems rely on heat or infrared sensors to detect the occupancy of a space. However, these sensors are limited to their particular field of view, and may require a number of sensors for large or complex areas. Moreover, heat or infrared sensors can generate false positives due to heat sources, for example appliances, or areas subject to sunlight.

Some other conventional systems use radar and sonar sensors, chemosensors, or video cameras. However, these systems have limited detection distance, may have difficulty in detecting a static person, and/or may require significant computational complexity. Moreover, in particular with video sensors, there may be privacy concerns for occupancy detection using video signals in a dwelling or other private locations.

Another form of occupancy detection uses audio sensors to determine whether a space is occupied. However, using audio systems to determine occupancy within a space is difficult in some environments, conditions, and when there is background noise present in the space. For example, presence detection in an open office environment or in the presence of TV, radio, or other background audio noise is more difficult than in a quiet single room environment. Moreover, conventional audio-based occupancy detection systems require multiple sensors to accurately determine presence or head count, which increases energy consumption, upfront cost, and computational complexity for operating the system.

What is needed therefore is an improved occupancy detection system.

SUMMARY

In one embodiment, a method of detecting occupancy in an area comprises obtaining, with a processor, an audio sample from an audio sensor and determining, with the processor, feature functional values of a set of selected feature functionals from the audio sample. The determining of the feature functional values comprises extracting features in the set of selected feature functionals from the audio sample, and determining the feature functional values of the set of selected features from the extracted features. The method further includes determining, with the processor, occupancy in the area using a classifier based on the determined feature functional values.

In some embodiments of the method, the classifier is a decision tree classifier.

In a further embodiment, the decision tree classifier has maximum depth of between 2 and 15. In another embodiment, the decision tree classifier has a maximum depth of five.

In yet another embodiment of the method, the set of feature functionals includes between 5 and 25 feature functionals. In another embodiment, the set of feature functionals includes between 10 and 20 feature functionals. In one particular embodiment, the set of feature functionals includes 11 feature functionals.

The features, in some embodiments, include one or more of envelope dynamic range, zero crossing rate, energy, brightness, spectral variance, spectral roll off, spectral flux, at least one MFCC coefficient, a delta of at least one MFCC coefficient, and a delta-delta of at least one MFCC coefficient. In further embodiments, the set of feature functionals includes at least one of the group consisting of: mean, median, standard deviation, absolute integral, minimum, maximum, dynamic range, dominant-frequency, and entropy, determined for each of the features.

In one embodiment, the set of feature functionals includes at least two selected from the group consisting of: maximum MFCC-1; mean energy; dynamic range of envelope dynamic range; mean of brightness; dynamic range of brightness; median of brightness; entropy of MFCC-4 delta; standard deviation of spectral flux; entropy of MFCC-19; standard deviation of envelope dynamic range; entropy of envelope dynamic range; absolute integral of MFCC-5 delta; entropy of zero crossing rate; absolute integral of brightness; entropy of spectral roll off; entropy of brightness; entropy of spectral flux; entropy of spectral variance; entropy of MFCC-7; entropy of MFCC-2 delta; entropy of MFCC-1 delta-delta; entropy of MFCC-5; entropy of energy; entropy of MFCC-3; and entropy of MFCC-20 delta.

In yet another embodiment, the set of feature functionals includes at least two selected from the group consisting of: maximum MFCC-1; mean energy; dynamic range of envelope dynamic range; mean of brightness; dynamic range of brightness; median of brightness; entropy of MFCC-4 delta; standard deviation of spectral flux; entropy of MFCC-19; standard deviation of envelope dynamic range; entropy of envelope dynamic range.

In some embodiments of the method, the set of selected feature functionals and the classifier are learned in a machine-learning training process.

In one embodiment of the method, the determining of the feature functional values further comprises segmenting the extracted features.

In another embodiment, a system for determining occupancy in an area comprises at least one audio sensor configured to record an audio sample in the area and a processor. The processor is configured to execute programmed instructions stored in a memory to obtain the audio sample from the audio sensor, determine feature functional values of a set of selected feature functionals from the audio sample, and determine occupancy in the are using a classifier based on the determined feature functional values. The determining of the feature functional values comprises extracting features in the set of selected feature functionals from the audio sample and determining the feature functional values of the set of selected features from the extracted features.

In one embodiment of the system, the classifier is a decision tree classifier.

In another embodiment, the decision tree classifier has maximum depth of between 2 and 15.

In a further embodiment according to the disclosure, the set of feature functionals includes between 10 and 20 feature functionals.

In some embodiments of the system, the features include one or more of envelope dynamic range, zero crossing rate, energy, brightness, spectral variance, spectral roll off, spectral flux, at least one MFCC coefficient, a delta of at least one MFCC coefficient, and a delta-delta of at least one MFCC coefficient; and the set of feature functionals include at least one of the group consisting of: mean, median, standard deviation, absolute integral, minimum, maximum, dynamic range, dominant-frequency, and entropy, determined for each of the features.

In yet another embodiment, the set of feature functionals includes at least two selected from the group consisting of: maximum of MFCC-1; mean of energy; dynamic range of envelope dynamic range; mean of brightness; dynamic range of brightness; median of brightness; entropy of MFCC-4 delta; standard deviation of spectral flux; entropy of MFCC-19; standard deviation of envelope dynamic range; entropy of envelope dynamic range; absolute integral of MFCC-5 delta; entropy of zero crossing rate; absolute integral of brightness; entropy of spectral roll off; entropy of brightness; entropy of spectral flux; entropy of spectral variance; entropy of MFCC-7; entropy of MFCC-2 delta; entropy of MFCC-1 delta-delta; entropy of MFCC-5; entropy of energy; entropy of MFCC-3; and entropy of MFCC-20 delta.

BRIEF DESCRIPTION OF THE DRAWINGS

FIG. 5A is a chart of the percentage of actual head counts in an experimental living room scenario.

FIG. 5B is a chart of the percentage of actual head counts in an experimental single office scenario.

FIG. 6 is a chart of the maximum depth of the decision tree against head counting accuracy in the experimental living room scenario.

DETAILED DESCRIPTION

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one skilled in the art to which this document pertains.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

The terms "comprising," "including," "having," and the like, as used with respect to embodiments of the disclosure, are synonymous. As used herein, the term "approximately" refers to values that are within ±20% of the reference value.

As used herein, the term "presence detection" refers to detecting whether any individuals are present in an area, and the term "head counting" refers to detecting the quantity of individuals in an area. As used herein, the terms "detect occupancy" and "occupancy detection" can refer to either presence detection or head counting.

Figure 1:
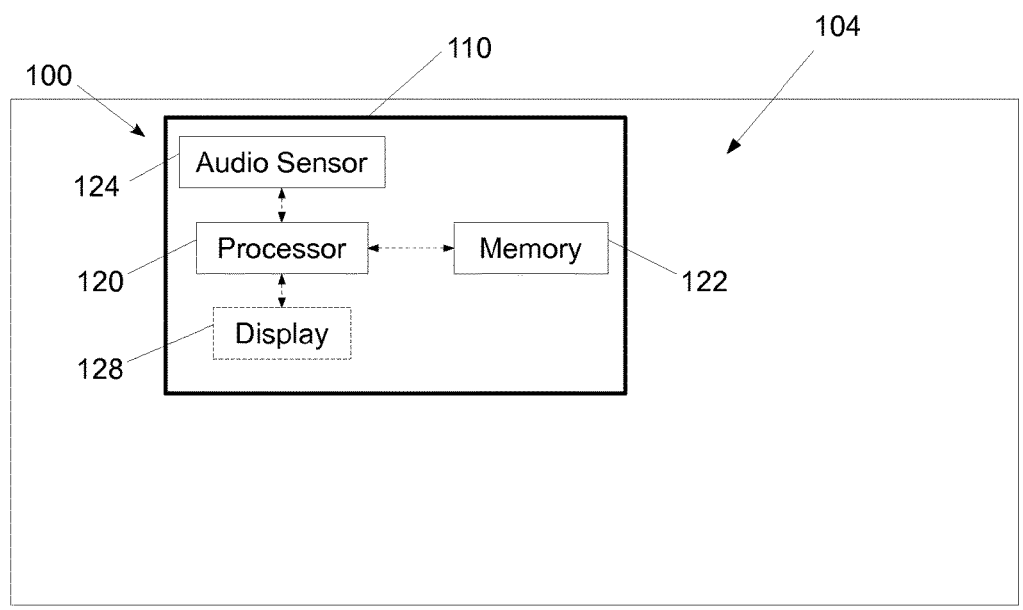
FIG. 1 is a schematic diagram of an occupancy detection system according to the disclosure in which only one audio sensor is used.

FIG. 1 schematically illustrates an exemplary embodiment of an occupancy detection system 100 that detects occupancy, for example detecting the presence of at least one individual and/or detecting the quantity of people, in an area 104. The area 104 may be a single room, a plurality of rooms, a desired portion of a single room or plurality of rooms, an outdoor area, any other area in which it is desired to detect occupancy, or any combination of the above. The occupancy detection system 100 is configured to monitor characteristics of one or more audio signals obtained from the area 104 and to determine whether the area 104 is occupied, or how many people occupy the area 104. In particular, the system 100 may utilize a machine learning model to classify feature functionals of the detected audio to determine occupancy of the area 104.

The occupancy detection system 100 includes a sensor package 110 that includes a processor 120 operably connected to a memory 122, and a single audio sensor 124, which can, for example, be a microphone or other suitable audio receiving device. In one embodiment, the audio sensor 124 may be a MEMS audio sensor formed as an application-specific integrated circuit (ASIC). The audio sensor 124 is configured to sense sound pressure waves and convert the sound pressure waves into a digital or analog electronic signal. The electronic signal is transmitted from the audio sensor 124 to the processor 120 via wired or wireless communication. In some embodiments, the system 100 may also include a display 128 operably connected to the processor 120 and configured to inform a user as to whether the area 104 is occupied and/or how many people occupy the area 104.

In some embodiments, the sensor package 110 may be part of another electronic device. For instance, in one embodiment, the sensor package 110 may be integrated in a computer, a smart home hub, an alarm controller, a portable electronic device such as a cellular telephone, a tablet, a smart watch, or the like. Moreover, in such an embodiment, the processor 120 and memory 122 may be the processor and memory used in the electronic device for general functioning of the electronic device, while the audio sensor 124 may be the microphone integrated in the electronic device. In other embodiments, however, the sensor package 110 may be a dedicated sensor package. In further embodiments, the processor 120, memory 122, audio sensor 124, and/or the display 128 may be separate, while the other components may be integrated in an electronic device.

As discussed in more detail below, the processor 120 is configured to process the audio signals and to use a classifier model on the detected audio signals to determine the occupancy in a room. It will be recognized by those of ordinary skill in the art that a "processor" includes any hardware system, hardware mechanism or hardware component that processes data, signals or other information. The processor 120 may include a system with a central processing unit, multiple processing units, dedicated circuitry for achieving functionality, or other systems.

The memory 122 is configured to store program instructions that, when executed by the processor 120, enable the sensor package 110 to perform various operations described below, including determining the occupancy in the area 104. The memory 122 may be of any type of device capable of storing information accessible by the processor 120, such as write-capable memories, read-only memories, or other computer-readable mediums.

In particular, the memory 122 is configured to store program instructions corresponding to at least one machine learning model, in particular to an occupancy classification model and classification parameters thereof. The processor 120 is configured to utilize the occupancy classification model to extract features from the audio signal or signals and to classify whether the area is occupied and/or how many individuals occupy the area. As used herein, the term "machine learning model" refers to a system or set of program instructions and/or data configured to implement an algorithm or mathematical model that predicts and provides a desired output based on a given input. It will be appreciated that parameters of a machine learning model are not explicitly programmed or the machine learning model is not necessarily designed to follow particular rules in order to provide the desired output for a given input. Instead, the machine learning model is provided with a corpus of training data from which the processor identifies or "learns" patterns and statistical relationships or structures in the data, which are generalized to make predictions with respect to new data inputs. The classification parameters include a plurality of values for parameters of the occupancy classification model which were learned during a training process.

Figure 2:
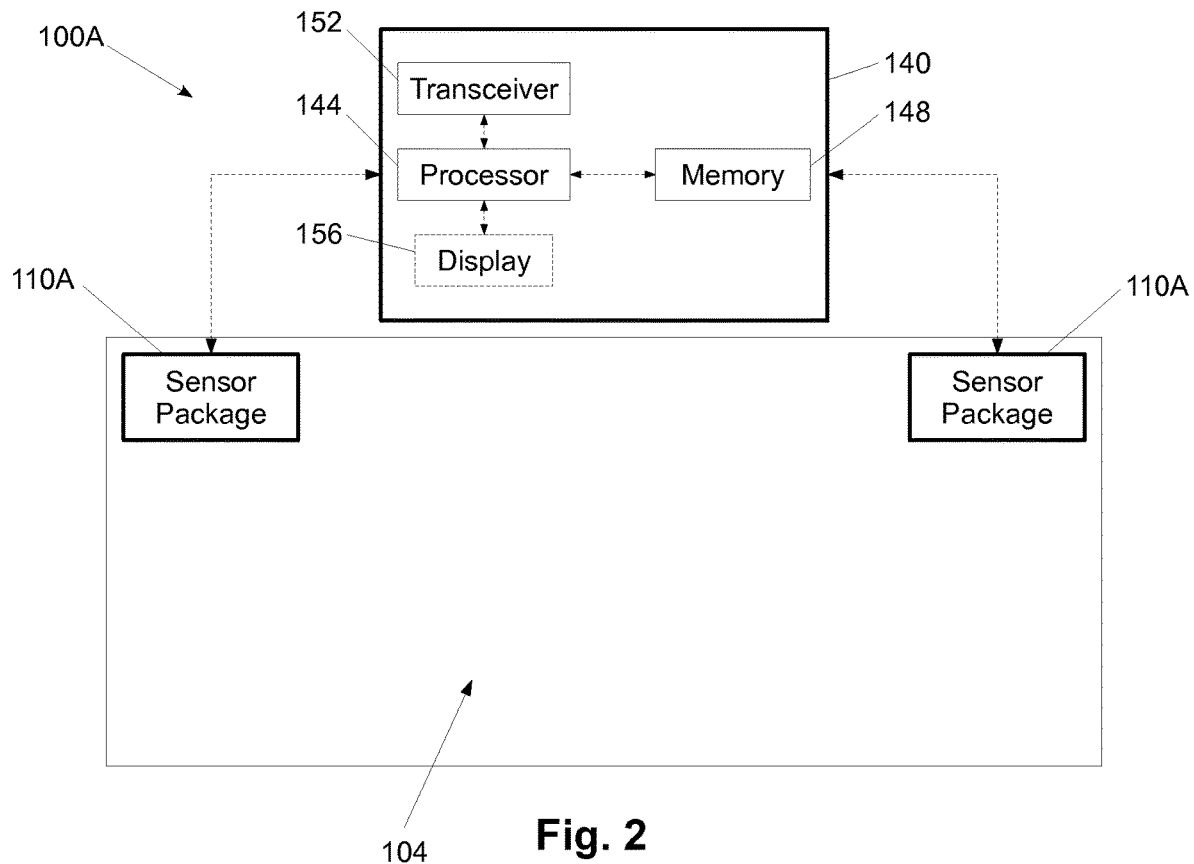
FIG. 2 is a schematic diagram of an occupancy detection system according to the disclosure in which a system controller determines occupancy.

While the embodiment of FIG. 1 includes only one sensor package 110 having only one audio sensor 124, the reader should appreciate that in other embodiments, as illustrated in FIG. 2, the system 100 may include two, three, or any suitable number of sensor packages 110 or audio sensors 124 as desired for a particular application.

FIG. 2 illustrates an occupancy detection system 100A that includes a plurality of sensor packages 110, two of which are shown in FIG. 2. The reader should appreciate, however, that the occupancy detection system 100A may include any desired number of sensor packages 110A. Each sensor package 110A may be configured similar to the sensor package 110 illustrated in FIG. 1, such that each sensor package 110A may include a processor and an audio sensor. In some embodiments, the sensor package 110A may also include a wireless data transceiver (not shown), and/or a battery (not shown) so as to enable the sensor packages 110A to be easily positioned at desired locations within the area 104. In further embodiments, the sensor packages 110A may include only an audio sensor, only an audio sensor and a transceiver, only an audio sensor and a battery, or only an audio sensor, a transceiver, and a battery.

The occupancy detection system 100A also includes a system controller 140, which communicates with the sensor packages 110A to obtain digital or analog signals from the sensor packages 110A corresponding to the audio signals received by the respective audio sensors. The system controller 140 is then configured to determine the occupancy of the area 104, as discussed in detail below. The system controller may be located in the area 104, or, as illustrated in FIG. 2, may be located outside the area. The system controller 140 may be connected to or integrated in, for example, a security system controller, a building emergency control unit, an HVAC controller, a computer, a portable electronic device, or another desired controller. In an alternative embodiment, the sensor packages 110A may be connected to one another for data transmission via a wired or wireless connection and configured such that the controller of one of the sensor packages 110A performs the determination of the occupancy. In some such embodiments, a system controller 140 may be omitted from the sensor system 100A.

The system controller 140 includes a processor 144 operably connected to a memory 148, a transceiver 152, and, in some embodiments, a display 156. The transceiver 152 includes for example, one or more of a Wi-Fi® transceiver, a ZigBee® transceiver, a Z-Wave® transceiver, a Bluetooth® transceiver, a wireless telephony transceiver, and RF transceiver, or another transceiver suitable to send and receive communication signals to and from the sensor packages 110A.

It will be recognized by those of ordinary skill in the art that a "processor" includes any hardware system, hardware mechanism or hardware component that processes data, signals or other information. The processor 144 may include a system with a central processing unit, multiple processing units, dedicated circuitry for achieving functionality, or other systems.

The memory 148 may be of any type of device capable of storing information accessible by the processor 144, such as write-capable memories, read-only memories, a memory card, ROM, RAM, hard drives, discs, flash memory, or other computer-readable medium. The memory 148 is configured to store program instructions that, when executed by the processor 144, enable the controller 140 to perform various operations described elsewhere herein, communicating with the sensor package 110A to receive the audio signal and classify the occupancy of the area using a machine learning model.

In particular, the memory 148 is configured to store program instructions corresponding to at least one machine learning model, in particular to an occupancy classification model and classification parameters thereof. The processor 144 is configured to utilize the occupancy classification model to extract features from the audio signal or signals and to classify whether the area is occupied and/or how many people occupy the area.

System Training

Figure 3:
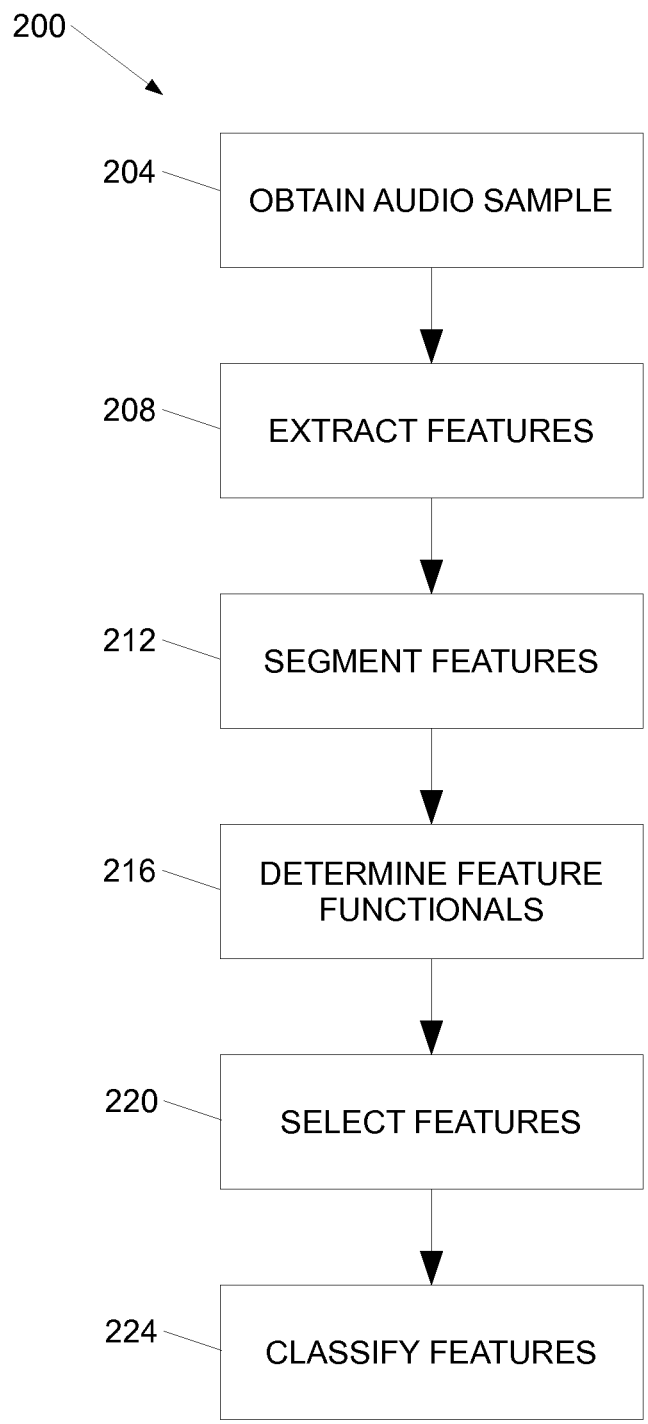
FIG. 3 is a process diagram of a method of training a machine learning model to detect occupancy in an area.

FIG. 3 illustrates a machine learning process 200 for training a machine-learning occupancy detection system such as the occupancy detection systems 100, 100A of FIGS. 1 and 2 to detect the occupancy of an area. In the description of the methods, statements that a method is performing some task or function refers to a controller or general purpose processor executing programmed instructions stored in non-transitory computer readable storage media operatively connected to the controller or processor to manipulate data or to operate one or more components in the occupancy detection systems 100, 100A to perform the task or function. Particularly, the processor 120 of the sensor package 110 or 110A or the processor 144 of the system controller 140 described above may be such a controller or processor. Alternatively, the controller or processor may be implemented with more than one processor and associated circuitry and components, each of which is configured to form one or more tasks or functions described herein. It will be appreciated that some or all of the operations the method can also be performed by a remote server or cloud processing infrastructure. Additionally, the steps of the methods may be performed in any feasible chronological order, regardless of the order shown in the figures or the order in which the steps are described.

The process 200 begins by obtaining an audio sample (block 204). In one embodiment, the audio sample is sensed by a single audio sensor, for example the audio sensor or microphone 124. In another embodiment, the audio sample is sensed by a plurality of audio sensors 124 that are adjacent to one another or spread out over the area in which the occupancy detection determination is performed. The processor communicates with the one or more audio sensors to receive a time series of acoustic values corresponding to the detected audio in the area. The processor obtains the sensed audio sample from the audio sensor(s) via direct connection or via communication over a wired or wireless network.

Next, the method proceeds with extracting features from the audio sample (block 208). The processor extracts audio low-level descriptive (LLD) features using a frame-level sliding window with no overlap, as summarized in Table 1. The frame lengths from which the LLD features are extracted may be from approximately 5 ms to approximately 50 ms. In some embodiments, the length of the frames is dependent on the features detected in the audio signal. In another embodiment, the LLD feature frame lengths are between approximately 10 and approximately 30 ms. In one particular embodiment, the LLD feature frame lengths are approximately 25 ms.

The LLD features extracted from the audio sample can be grouped into three main categories: time domain features, frequency domain features, and cepstral domain features. The time domain features can include, for example, the envelope dynamic range (i.e. the range of the temporal envelope of the signal) and zero crossing rate (i.e. the number of time-domain zero crossings of the signal within a processing frame, which is indicative of the frequency of signal amplitude sign change), both measured in a single dimension. The frequency domain features can include, for example, energy of the signal (i.e. the summation of the square power of the signal), brightness (i.e. the measure of high-frequency content in the signal, measured using the spectral centroid, or the weighted mean of the frequencies, of the signal), spectral variance (i.e. the statistical variance of the frequency spectrum), spectral roll-off (the frequency under which a specified N percentile of the total energy of the power spectral distribution is contained; useful for distinguishing voiced speech from unvoiced noise), and spectral flux of the audio signal (represented by, for example, a two-norm of the frame-to-frame spectral amplitude difference vector, which defines the amount of frame-to-frame fluctuation in time), again measured in a single dimension.

The cepstral domain features mel-frequency cepstral coefficients (MFCC) and their differential (also referred to as "delta" or "d") and acceleration (also referred to as "delta-delta" or "dd") coefficients. MFCC's are coefficients that are commonly used in the art to enable automated frequency detection to interpret frequency differences more like the human ear. In some embodiments, the frames used for the MFCC's are, for example, between approximately 10 ms to approximately 50 ms, between approximately 20 ms to approximately 40 ms, or approximately 25 ms. In the embodiments described below, the MFCC's are calculated with 20 filter banks. The reader should appreciate, however, that, in other embodiments, MFCC's are calculated using between 20 and 40 mel-frequency filter banks. In certain embodiments, only coefficients of the lower 12-13 mel-frequency filter banks are kept, while the coefficients of the higher filter banks may be discarded to arrive at the MFCC's for each frame. In other embodiments, the coefficients of the lower 20 mel-frequency filter banks are retained, with the remaining filter banks discarded.

TABLE 1

Low level descriptive (LLD) features and functionals:

| Features | Dimension | Functional |
|---|---|---|
| Envelope dynamic range | 1 | Mean |
| Zero crossing rate | 1 | Median |
| Energy | 1 | Std |
| Brightness | 1 | Abs Integral |
| Spectral variance | 1 | Min |
| Spectral roll off | 1 | Max |
| Spectral flux | 1 | Dynamic range |
| MFCC | 20 | Dominant-frequency |
| MFCC-d | 20 | Entropy |
| MFCC-dd | 20 | |

The process 200 continues by partitioning the features into segments with a fixed length in time and a shift of one frame (block 212). Thus, the feature frames are aggregated over the segment length to determine the segmented features. The segments may have length of, for example, between 1 second and 600 seconds. In one embodiment, the segments have length of between 3 seconds and 60 seconds. In one particular embodiment, the features are partitioned into 30 second segments. In other embodiments, the features are partitioned into different segment lengths depending on the feature functionals applied to the particular features. Furthermore, in some embodiments, the processor analyzes different segment lengths for the features to investigate the optimum time window for the particular occupancy detection task. The optimum time window may be based on the features in the audio signal and/or the features of the area in which the occupancy detection is performed.

In some embodiments, the segments may overlap one another such that each segment is calculated shifted by one feature frame. In other embodiments, the segments may only partially overlap, such that each segment is shifted by 5, 10, 25, 50, 100, or any desired shift, from the adjacent segment. In further embodiments, the segments may not overlap one another.

Next, the process 200 proceeds with the processor applying functionals to the determined LLD features and the respective delta and acceleration coefficients of the LLDS for each segment (block 216). As illustrated in Table 1, the functionals applied are statistical operations including, for example, one or more of determining the mean, median, standard deviation, absolute integral, minimum, maximum, dynamic range, dominant-frequency, or entropy (determined, for example, using the Shannon entropy equation) of the determined and segmented LLDs. The processor may be configured to determine every functional of every LLD feature as the determined feature functionals. Alternatively, the processor may be configured to determine a limited number of feature functionals to reduce computational resources necessary for the determination of the feature functionals.

The process 200 continues with the processor selecting feature functionals that contain information most relevant of occupancy of an area from the determined feature functionals (block 220). In particular, the controller analyzes the contribution of different audio feature types determined from the LLDs for the classification accuracy. In some embodiments, since there may be a large number of possible audio features in the audio sample, the selecting of the features may include performing transformations of the features or selecting only a subset of the features to analyze. Reducing the number of features for classification improves the speed and reduces the complexity of the computation. In particular, the feature selection methods pool together the most relevant and uncorrelated features and define the effect of each feature in presence detection and head counting tasks.

Feature selection as an automatic method to select the most relevant features to the modeling problem has many benefits, such as improving the performance, providing a faster and simpler model that requires reduced computational resources, and allowing better understanding of the data and its underlying process. Different feature selection methods put more emphasis on one aspect than others. In some embodiments, the feature selection may include univariate chi-squared ($\chi^2$ or Chi2) statistical analysis and/or least absolute shrinkage and selection operator (LASSO) statistical, in particular LASSO using the l1 penalty. Both of these feature selection methods provide simple, quick, and effective feature selection.

In the feature selection, the correlation or independence of the various different feature functionals are determined using chi-squared and/or LASSO analysis. The processor determines the correlation between different feature functionals and the correlation between the features and known results (i.e. known presence or head count in the area). Feature functionals that exhibit low correlation with the known results are removed (i.e. not selected) because these feature functionals do not contain sufficient information relevant to the presence or head count determination. Conversely, features that are strongly correlated with the known results are retained. Additionally, features that are strongly correlated with one another may be discarded such that only one of the strongly correlated features remains. This enables the presence detection or head counting process to be performed with fewer feature calculations, and therefore less computational resources are necessary for the process.

The feature extraction may include more than 500 feature functionals that can be extracted from the data. However, many of these feature functionals are correlated with one another, or are uncorrelated with the presence detection and/or head count. In the feature selection step, the processor is configured to rank the best feature functionals for determining presence or head count. In one particular embodiment, 20 feature functionals are selected. In a further embodiment, the processor selects only the 11 best feature functionals (i.e. the feature functionals exhibiting high correlation with the known results, while limiting feature functionals correlated with one another to only one of the correlated feature functionals) in the feature selection step.

The number of feature functionals selected may vary in different embodiments based on whether the system is configured for presence detection or for head counting. In particular, accurate head counting may require more features than presence detection, since head counting requires determining not only if people are present, but the quantity of people present in the area.

Finally, the process concludes by classifying the selected features (block 224). In some embodiments, the controller 120, 140 generates a decision tree classifier, which advantageously has a fast inference time, is simple to interpret, and is computationally efficient. A decision tree is a type of supervised machine learning in which the controller continuously splits the data along decision nodes until arriving at a leaf, or final outcome. In other embodiments, depending for example on the amount of training data available, the computational resources available and the required online factor, other classifiers such as support vector machine, deep neural networks, etc. may be used in place of the decision tree classifier.

In the process 200, the decision tree may be determined using a recursive binary splitting procedure, for example using greedy splitting and/or Gini impurity decision criterion. The decision tree may be configured for a number of parameters. In one embodiment, the decision tree classifier may be configured with a prespecified depth, minimum size for split, minimum leaf size, etc. In addition, in certain embodiments, an ensemble decision tree, which combine a plurality of independently generated decision trees (i.e. multiple "estimators") using the audio data to generalize the classifier, which can in some embodiments improve the robustness of the process 200.

In various embodiments, the decision tree may be generated with, for example, between 1 and 5 estimators, a maximum depth of between 2 and 15, a minimum size for split of between 2 and 15, and a minimum leaf size of between 1 and 15. In one particular embodiment, the decision tree is generated using one estimator, maximum depth of 5, minimum size for split of 5, minimum leaf size of 1, and Gini impurity decision criterion. The reader should appreciate, however, that in other embodiments any desired values may be used for the number of estimators, maximum depth, minimum size for split, and minimum leaf size.

In at least one embodiment, the training process is performed on an external device, such as a server (not shown), and the resulting classification parameters are provided to the occupancy detection system 100, 100A for storage in the memory 122, 148 and subsequent usage. In such embodiments, the system may be easily adapted to a variety of different uses with reduced outlay and installation cost.

In another embodiment, the training process is performed as a system calibration when the occupancy detection system 100, 100A is installed and the training data is then stored in the memory 122, 148 for subsequent use. The occupancy detection system machine learning algorithm is therefore tailored to the specific area in which the system is installed. In such embodiments, a high degree of accuracy is obtainable since the classification parameters are based on the specific characteristics of the area in which the system is installed.

Occupancy Detection

Figure 4:
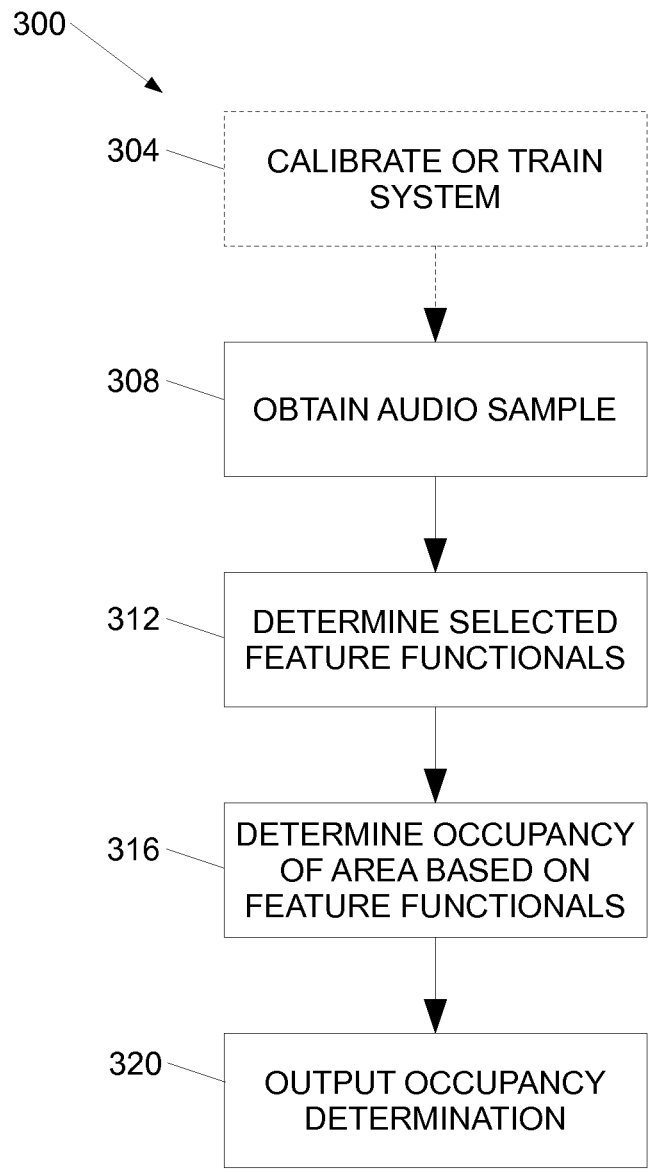
FIG. 4 is a process diagram of a method of detecting occupancy in an area using a machine learning model.

FIG. 4 illustrates a flow chart of a process 300 for determining occupancy in an area. The process 300 refers to a processor, for example the processor 120 or 144 executing programmed instructions stored in a memory, for example memory 122 or 148, to perform the functions described below to detect the occupancy of an area. In the description of the methods, statements that a method is performing some task or function refers to a controller or general purpose processor executing programmed instructions stored in non-transitory computer readable storage media operatively connected to the controller or processor to manipulate data or to operate one or more components in the occupancy detection systems 100, 100A to perform the task or function. Particularly, the processor 120 of the sensor package 110 or 110A or the processor 144 of the system controller 140 described above may be such a controller or processor. Alternatively, the controller or processor may be implemented with more than one processor and associated circuitry and components, each of which is configured to form one or more tasks or functions described herein. It will be appreciated that some or all of the operations the method can also be performed by a remote server or cloud processing infrastructure. Additionally, the steps of the methods may be performed in any feasible chronological order, regardless of the order shown in the figures or the order in which the steps are described. By way of example, in some embodiments, the process 300 may be performed by a computer, a smart home hub, an HVAC controller, an alarm controller, a portable electronic device such as a cellular telephone, a tablet, or a smart watch, or the like.

In some embodiments, the process 300 begins by calibrating or training the system (block 304). The training may, for example, be performed using the process 200 of FIG. 3. The selected features, functionals, and/or classifier, for example the decision tree, from the calibration or training of the system are stored in the memory, e.g. memory 122 or 148, associated with the processor. In other embodiments, the system may be pre-programmed with the selected features, functionals, and/or classification algorithm such that some or all of the calibration or training of the machine-learning occupancy detection system is not necessary. In one embodiment, between 5 and 25 feature functionals are selected. In another embodiment, between 10 and 20 feature functionals are selected. In one particular embodiment, 11 feature functionals are selected.

The process then proceeds with the processor obtaining an audio sample (block 308) using an audio sensor, for example a microphone. In one embodiment, the audio sample is sensed by a single audio sensor, for example the audio sensor or microphone 124. In some embodiments, the audio sample is sensed by a computer, a smart home hub, an alarm controller, a portable electronic device such as a cellular telephone, a tablet, or a smart watch, or the like. In another embodiment, the audio sample is sensed by a plurality of audio sensors that are adjacent to one another or spread out over the area in which the occupancy detection determination is performed. The processor communicates with the one or more audio sensors to receive a time series of acoustic values corresponding to the detected audio in the area. The processor obtains the sensed audio sample from the audio sensor(s) via direct connection or via communication over a wired or wireless network.

Next, the processor determines the selected feature functionals from the audio sample (block 312). The processor 120 or 144 extracts the audio LLD features, segments the extracted features, and determines the feature functionals in a similar manner as described above in the process 200 of FIG. 4. The frame lengths from which the LLD features are extracted may be from approximately 5 ms to approximately 50 ms. In some embodiments, the length of the frames is dependent on the features detected in the audio signal. In another embodiment, the LLD feature frame lengths are between approximately 10 and approximately 30 ms. In one particular embodiment, the LLD feature frame lengths are approximately 25 ms.

As in the process 200 described above, the segments may have length of, for example, between 1 second and 600 seconds. In one embodiment, the segments have length of between 3 seconds and 60 seconds. In one particular embodiment, the features are partitioned into 30 second segments. In other embodiments, the features are partitioned into different segment lengths depending on the feature functionals applied to the particular features. Furthermore, in some embodiments, the processor analyzes different segment lengths for the features to investigate the optimum time window for the particular occupancy detection task. The optimum time window may be based on the features in the audio signal and/or the features of the area in which the occupancy detection is performed. In some embodiments, the segments may overlap one another such that each segment is calculated shifted by one feature frame. In other embodiments, the segments may only partially overlap, such that each segment is shifted by 5, 10, 25, 50, 100, or any desired number of frames, from the adjacent segment. In further embodiments, the segments may be adjacent and not overlap one another.

In contrast to the training process 200 described above, the process 300 for determining occupancy is limited in the number of feature functionals determined. The reader should appreciate, however, that any desired number of feature functionals may be used depending on the desired accuracy and computational resources available. Additionally, the selected features may vary based on the data received from executing the machine learning models. As discussed above with regard to the training and calibration process 200, and as will be explained with reference to experimental results below, the selected feature functionals may be those feature functionals that provide the greatest amount of information related to the presence and/or head count in the area.

Table 2 lists 25 feature functionals determined to include information relevant to head counting from an experimental training process discussed in detail below. In one embodiment, all 25 feature functionals from the table are selected. In another embodiment, between 10 and 20 of the feature functionals from Table 2 are selected. In another embodiment, 11 of the feature functionals from Table 2 are selected. In some embodiments, the number of selected feature functionals selected may be selected from Table 2 in descending order (i.e. an embodiment with 11 selected feature functionals may use feature functionals 1-11 in Table 2).

TABLE 2

25 Feature Functionals Determined by Experiment to be Relevant to Head Counting

| | Feature | Functional |
|---|---|---|
| 1 | MFCC-1 | Maximum |
| 2 | Energy | Mean |
| 3 | Envelope Dynamic Range | Dynamic Range |
| 4 | Brightness | Mean |
| 5 | Brightness | Dynamic Range |
| 6 | Brightness | Median |
| 7 | MFCC-4 delta | Entropy |
| 8 | Spectral Flux | Standard Deviation |
| 9 | MFCC-19 | Entropy |
| 10 | Envelope Dynamic Range | Standard Deviation |
| 11 | Envelope Dynamic Range | Entropy |
| 12 | MFCC-5 delta | Absolute Integral |
| 13 | Zero Crossing Rate | Entropy |
| 14 | Brightness | Absolute Integral |
| 15 | Spectral Roll off | Entropy |
| 16 | Brightness | Entropy |
| 17 | Spectral Flux | Entropy |
| 18 | Spectral Variance | Entropy |
| 19 | MFCC-7 | Entropy |
| 20 | MFCC-2 delta | Entropy |
| 21 | MFCC-1 delta-delta | Entropy |
| 22 | MFCC-5 | Entropy |
| 23 | Energy | Entropy |
| 24 | MFCC-3 | Entropy |
| 25 | MFCC-20 delta | Entropy |

The process 300 continues with the processor 120 or 144 determining the occupancy of the area based on the feature functionals using a classifier (block 316). As discussed above, the classifier may be developed using a machine learning model such as the machine-learning training process of FIG. 3. The determination of the occupancy may be performed using a decision tree.

In one particular embodiment, the decision tree used may have, for example, a depth of between 2 and 15. In one particular embodiment, the decision tree used has maximum depth of 5. The reader should appreciate, however, that in other embodiments any desired values may be used for the maximum depth and other parameters of the decision tree.

The decision tree classifier determines, based on the input audio data as segmented and analyzed via feature functionals, what the occupancy of the area is likely to be. The decision tree output may be, in one embodiment, probability of a certain number of people present in the area, or probability that any individuals are present in the area. In another embodiment, the decision tree output may be a value of the determined number of individuals present in the area, or presence or lack of presence in the area.

The method 300 continues by generating an output based on the determination of occupancy (block 320). The output may, in one embodiment, be a perceptible output depending on the occupancy determination made using the classifier depicted on the display 128 or 156. The perceptible output may include an indication of whether presence is detected in the area or whether no presence is detected in the area based on the determination made using the classifier. In another embodiment, the perceptible output may be an indication on the display of the quantity of people in the area based on the determination made using the classifier. In other embodiments, the perceptible output may be an audible indicator, such as an alert or alarm, or light indicator.

In a further embodiment, the output is an electronic signal transmitted to another electronic device or stored in a memory or the memory 122, 148. For example, the output may be an electronic signal output to a computer, a smart home hub, an HVAC controller, an alarm controller, a portable electronic device such as a cellular telephone, a tablet, or a smart watch, or the like. The received output may cause the electronic device to execute programmed instructions to, for example, activate an alarm, operate HVAC systems, activate or deactivate lights, or perform other automated functions.

The disclosed systems 100, 100A and processes 200, 300 provide a number of improvements to computer and occupancy detection technology by affording an efficient and cost-effective way to increase occupancy detection performance over conventional systems. The system 100 and processes 200, 300 enable detection of occupancy and head counting in realistic scenarios using only audio signals collected from the environment. Audio processing is generally less computationally intensive than other occupancy detection technologies, for instance video processing, and therefore the disclosed audio based occupancy detections system requires less computational resources as compared to conventional occupancy detection systems. Furthermore, the use of audio signals enables the system 100 to be easily accessible in a variety of different environments and scenarios.

In addition, using audio signals improves the accuracy of the occupancy detection in different applications as compared to conventional systems. Using only audio signals is more desired in some applications because the audio detection is considered to be less intrusive to privacy as compared to other conventional occupancy detection systems and methods such as, for example, video occupancy detection. Additionally, the disclosed system and process provides excellent coverage of a room as compared to conventional occupancy detection systems that have a limited field of view (e.g. infrared or video based systems) or are constrained based on the position of the sensor.

Moreover, the occupancy detection used in the disclosed system and process enables determination of a limited number of features and feature functionals that are likely to provide information on whether an area is occupied and/or how many people occupy the area. As a result, the required computational resources, and therefore the energy costs of the system are reduced. The occupancy detection process can therefore be performed on devices with reduced computational power as compared to conventional methods. For instance, the occupancy detection process may be performed on a portable electronic device, such as a cellular telephone, tablet, or smart watch.

Experimental Results

Two experiments were performed using the system 100 and processes 200, 300 in a simulated living room environment and in a simulated office environment. In both experiments, functionals were applied with time windows of 5 seconds. In addition, a leave-one-recording-out cross-validation method was used in the experiments as an evaluation technique. Consequently, 9-fold and 7-fold cross-validation were used in the living room and single office scenarios, respectively. Finally, classification accuracy was used as the performance measurement.

The audio samples utilized in the first experiment were drawn from a multisensory occupancy detection corpus that includes recordings collected in a single office environment (representative of a commercial scenario), while the audio samples from the second experiment were drawn from a simulated living room environment (representative of a residential scenario). The audio data was recorded in 44.1 kHz using a MEMS acoustic sensor manufactured by Robert Bosch GmbH with the model number AKU151. It is noted that the sensor used is specifically designed for use in space-constrained consumer electronic devices, for example portable electronic devices. The number of people present at a given time in the experimental environments was available throughout the entire corpus based on video recordings to verify the accuracy of the occupancy detection.

The single office data was acquired in a small, enclosed room including one fully equipped office work place. The recordings were carried out over seven days during daytime on workdays. The recorded audio data mostly includes the regular office work of a single person, including phone conversations and longer meetings with a second colleague. Additionally, in order to increase the data variety and balance the presence ratio, data was recorded on a day off and over one night. Approximately 75 hours of audio data were collected form the single office scenario. The percent of sampled time of each head count in the single office scenario is illustrated in FIG. 5A.

The living room data was acquired in a larger lab room that was furnished as a simple living room setting. Data was recorded over six sessions, each session following a predefined protocol with activities in varying order. The following activities were carried out: watching TV, reading newspaper, talking, and playing a card game. The number of people present in the room as well as an approximate length of each activity was defined in the protocol. Approximately 22 hours of audio data were collected from the living room scenario. The percent of sampled time of each head count in the simulated living room is illustrated in FIG. 5B.

Figure 7:
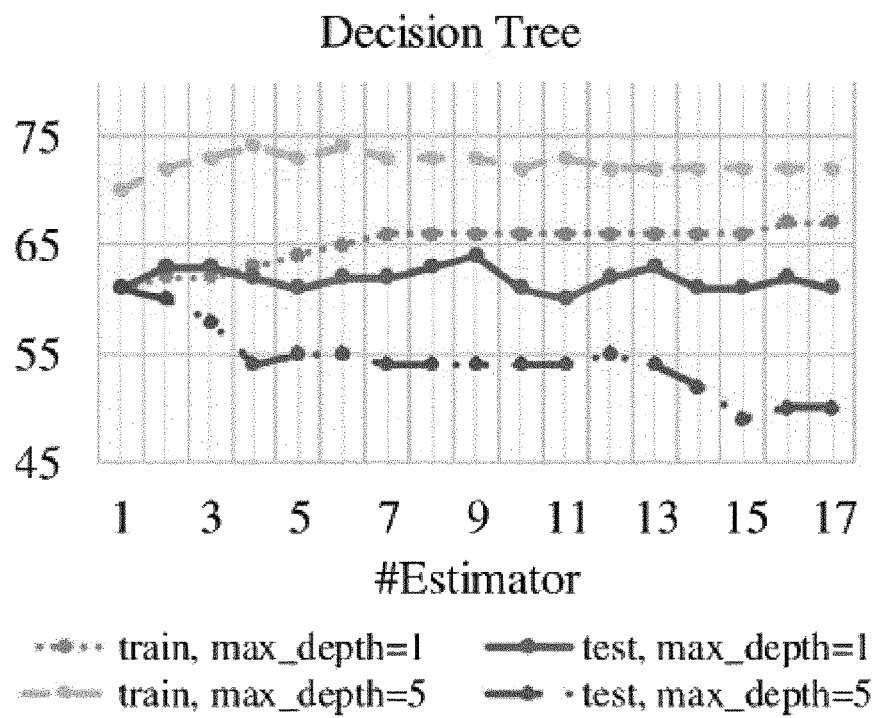
FIG. 7 is a chart showing the number of estimators used in the decision tree against head counting accuracy for the experimental living room scenario.

The classifier performance on the full feature set in the living room environment is shown in FIGS. 6 and 7. FIG. 6 illustrates a plot of the decision tree performance with respect to maximum depth with one estimator, minimum size for split of 5, minimum leaf size of 1, and Gini impurity decision criterion. As observed in the experimental embodiment, using a deeper tree may result in an over-fitted model and, further, the deeper tree increases the computational complexity of the model.

FIG. 7 illustrates the boosted decision tree classification performance with respect to the number of estimators, with the other parameters of the model kept the same. Based on this figure, in the experimental embodiment, performance gain by using the ensemble method is minimal. At the end, a simple decision tree with maximum depth of five and only one estimator is chosen as the baseline system for the experimental embodiments due to the performance and computational cost trade-off. Because the experiments depicted in FIGS. 6 and 7 required lengthy computations, the same experiments were not repeated for the single office environment on the full feature set, and instead the same decision tree parameters were used for both the living room and single office environments.

Figure 8:
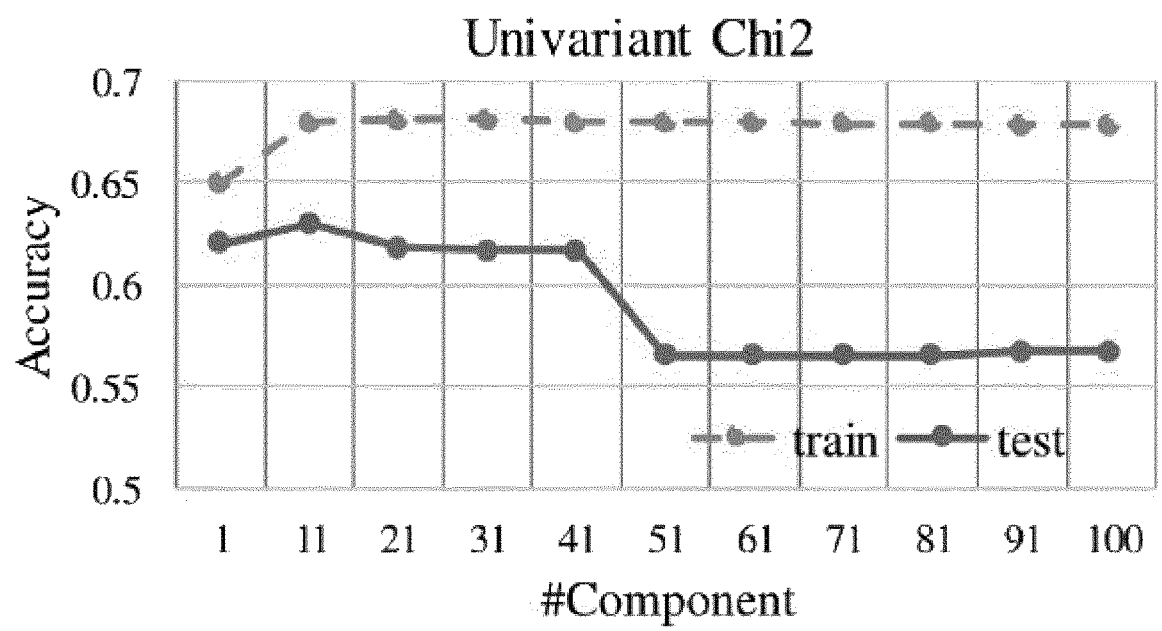
FIG. 8 is a chart of the number of feature functionals used against the head counting accuracy for the experimental living room scenario using Chi2 analysis.

In the next experiments, the feature variable informational contributions in head counting tasks were analyzed using Chi2 and LASSO methods in the living room scenario. FIG. 8 shows the system accuracy with respect to number of features chosen via the Chi2 method. As seen in the FIG. 8, out of hundreds of feature functionals, choosing only two feature functionals that have the highest Chi2 value between the feature variables and known results improves the performance up to 7% absolute value and greatly increases the speed of the classifier.

Figure 9:
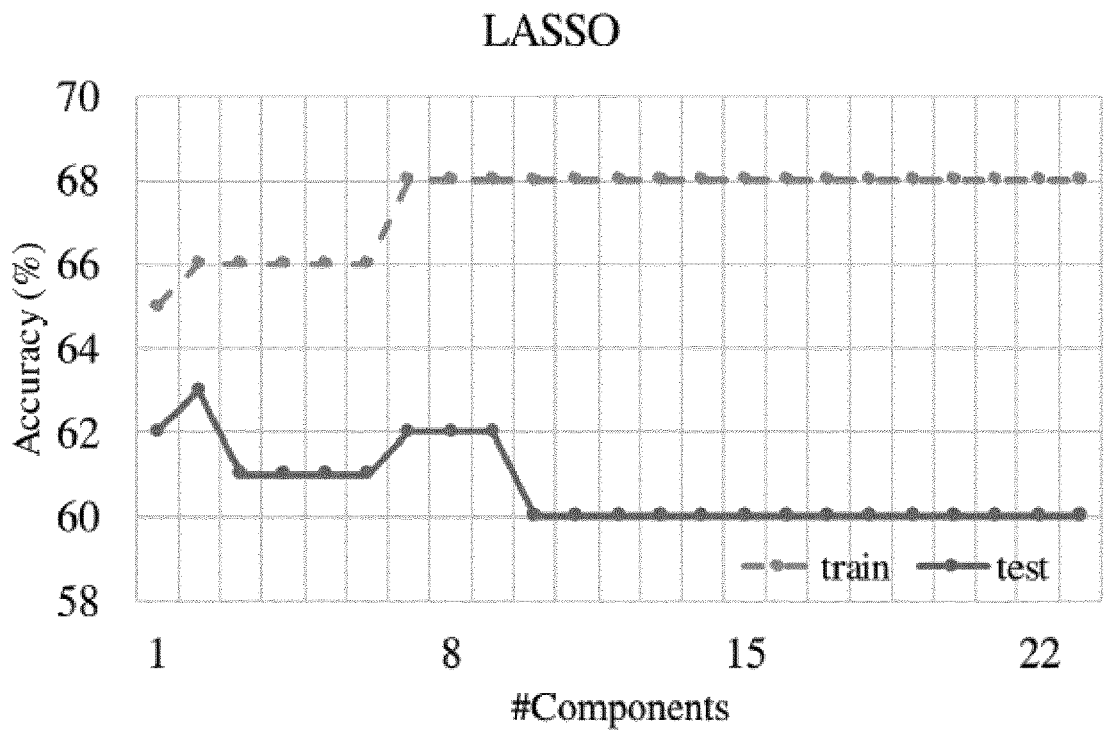
FIG. 9 is a chart of the number of feature functionals used against the head counting accuracy for the experimental living room scenario using LASSO analysis.
Figure 10:
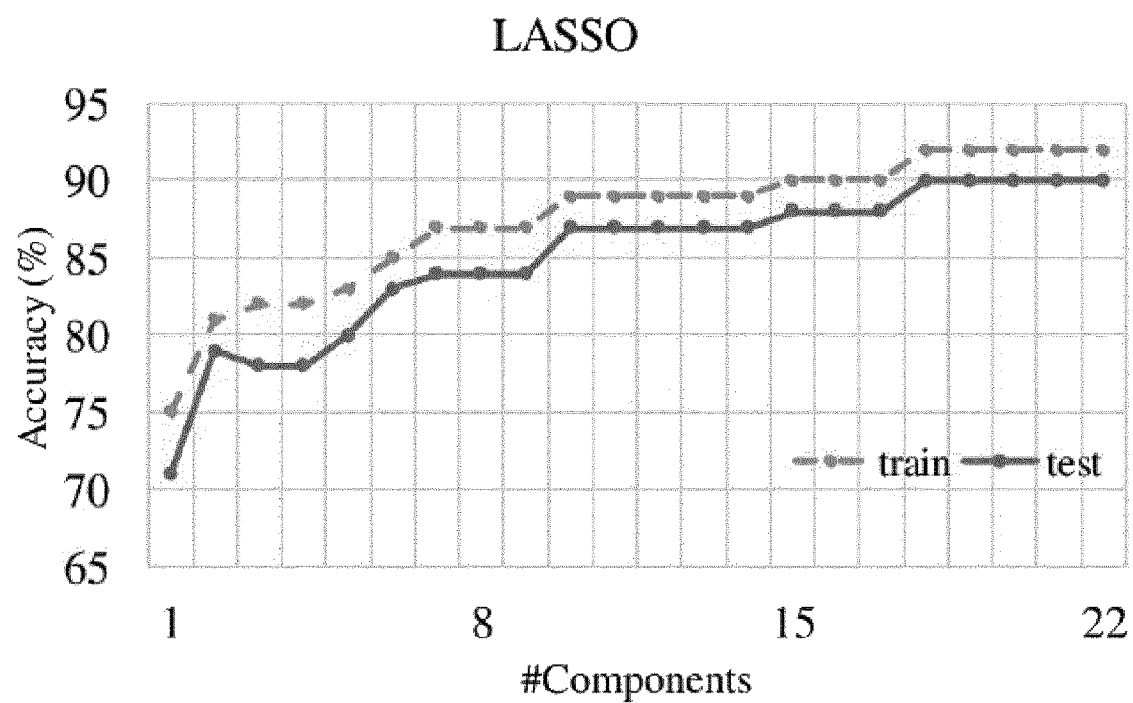
FIG. 10 is a chart of the number of feature functionals used against the head counting accuracy for the experimental single office scenario using LASSO analysis.

FIG. 9 depicts the classifier accuracy with respect to features as selected using the LASSO method in living room scenario. The results of the LASSO selected feature functionals are generally in agreement with the results from Chi2 feature selection. Given the similar accuracy trend between Chi2 and LASSO methods in the living room scenario, the experiments were continued using LASSO feature functional selection for the single office environment. As illustrated in FIG. 10, selecting a relatively low number of feature functionals provides a reasonable classification performance in the single office scenario as well. The reader should note that the results from LASSO and Chi2 feature functional selection methods are in agreement with the decision tree classification results in FIGS. 6 and 7, in which an only one- or two-layer decision tree can yield accurate classification results.

TABLE 3

Selected Feature Functionals for Two Experimental Embodiments

| LASSO-Single Office | LASSO-Living Room |
|---|---|
| 1. Mean-Energy | 1. Max-mfcc1 |
| 2. Mean-Brightness | 2. Dynamic Range-Envelope Dynamic Range |
| 3. Median-Brightness | |
| 4. Std-SpectralFlux | 3. Dynamic Range-Brightness |
| 5. Std-Envelope Dynamic Range | 4. Entropy-d4 |
| 6. AbsIntegral-d5 | 5. Entropy-mfcc19 |
| 7. Abs Integral-Brightness | 6. Entropy-Envelope Dynamic Range |
| 8. Entropy-Brightness | |
| 9. Entropy-Spectral Variance | 7. Entropy-Zero Crossing Rate |
| 10. Entropy-d2 | 8. Entropy-Spectral Rolloff |
| 11. Entropy-d4 | 9. Entropy-Spectral Flux |
| 12. Entropy-Energy | 10. Entropy-mfcc7 |
| 13. Entropy-Envelope Dynamic Range | 11. Entropy-dd1 |
| | 12. Entropy-mfcc5 |
| 14. Entropy-d20 | 13. Entropy-Brightness |
| 15. Entropy-Spectral Flux | 14. Entropy-mfcc3 |
| 16. Entropy-dd1 | 15. Entropy-d2 |
| 17. Entropy-mfcc5 | 16. Entropy-d4 |
| 18. Entropy-mfcc3 | 17. Entropy-Energy |
| | 18. Entropy-d20 |

Figure 11:
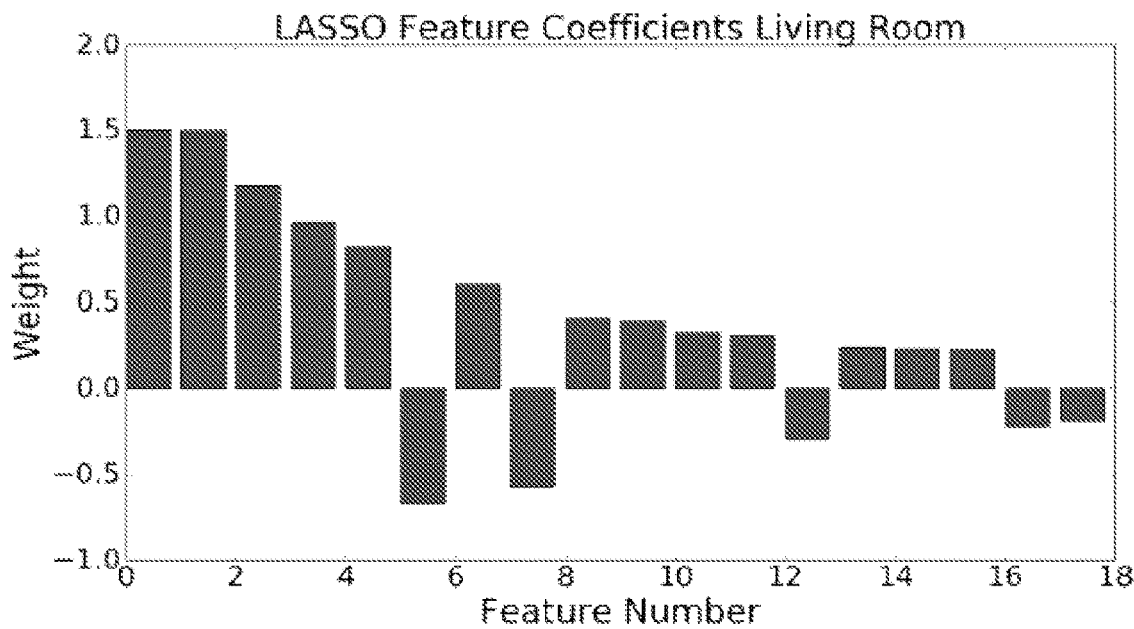
FIG. 11 is a chart illustrating the LASSO feature coefficients for eighteen feature functionals illustrated in Table 3 for the experimental living room scenario.
Figure 12:
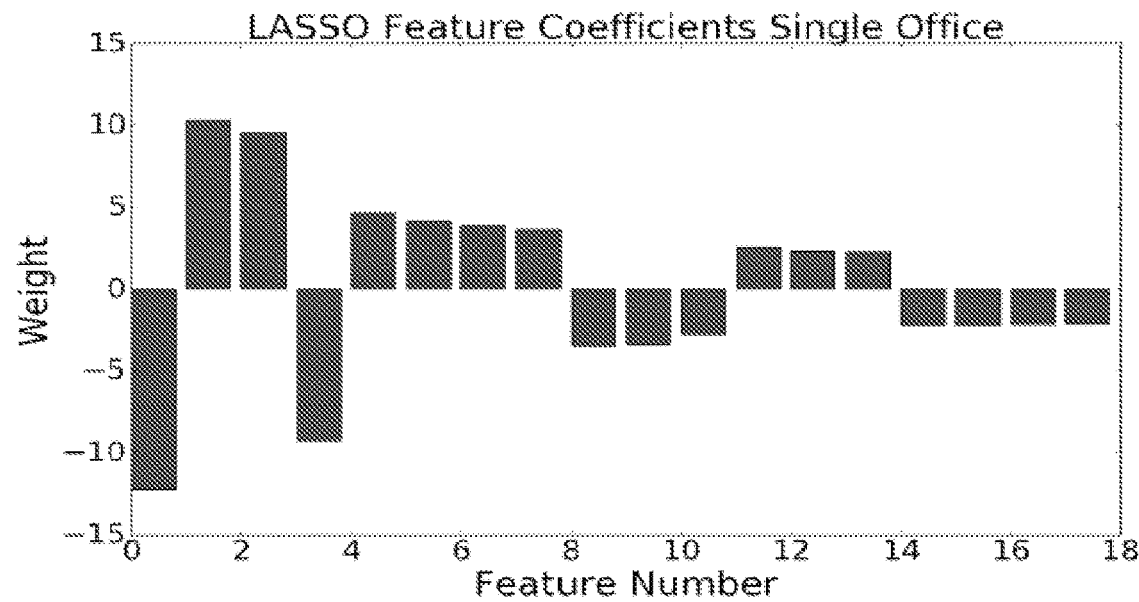
FIG. 12 is a chart illustrating the LASSO feature coefficients for eighteen feature functionals illustrated in Table 3 for the single office scenario.

Table 3 summarizes the top eighteen most relevant feature functionals determined for both the living room and single office environments. FIGS. 11 and 12, respectively, depict the LASSO coefficients for each of the feature functionals in the order of Table 3 for the living room and single office scenarios, respectively. As shown in Table 3, the most important feature chosen in both experimental environments was an energy term (it is noted that the first MFCC coefficient is a representation of the audio signal energy representation as well). This result is expected heuristically. However, two different functionals, namely maximum and mean, were selected as the functional with the highest LASSO coefficient for the living room and single office scenarios, respectively. Also, it appears from the selected features in the experimental embodiments that the time and frequency audio features are considered more relevant in the experimental head counting scenarios as compared to the cepstral (MFCC) features.

Figure 13:
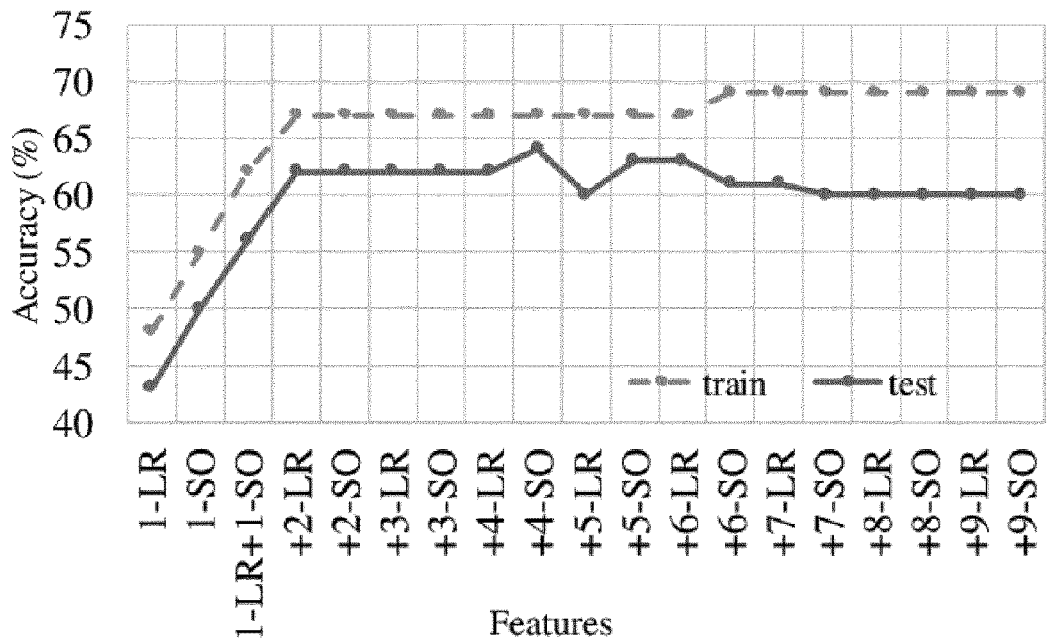
FIG. 13 is a chart of the combined feature functionals from both the living room and single office scenarios of Table 3 charted against head counting accuracy in the living room scenario.
Figure 14:
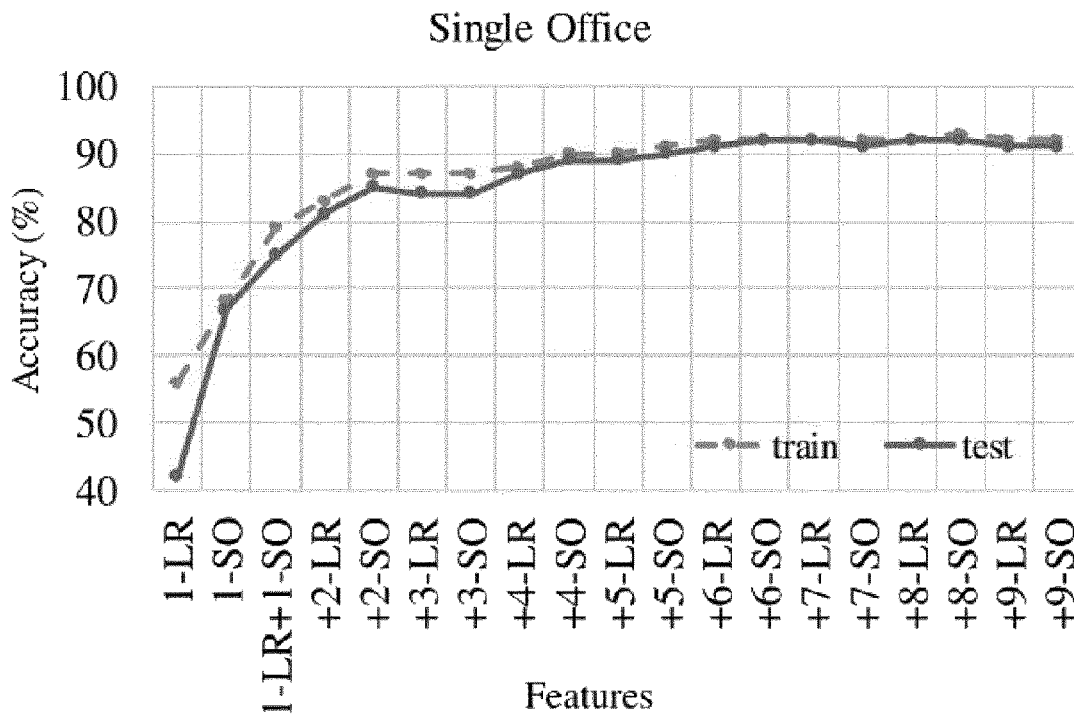
FIG. 14 is a chart of the combined feature functionals from both the living room and single office scenarios of Table 3 charted against head counting accuracy in the single office scenario.

To compare the best feature functionals across both environments, head count performance vs. attributes was then studied, as illustrated in FIGS. 13 and 14 for the living room and single office environments, respectively. In these figures, the x-axis represent the attributes exploited in each experiment. #-LR and #-SO, respectively, represent the feature number selected in the living room (LR) and single office (SO) scenarios from Table 3. Moreover, the + sign at the beginning of the x-axis label shows the attribute accumulation from the previous step. For example, the first point in the plot (1-LR) represents the accuracy when using the first best feature in living room scenario (Max-mfcc1), 1-LR+1-SO shows the performance when using first feature of both environments (Max-mfcc1 and Mean-Energy), +2-LR represents the accuracy when using 3 dimensional features 1-LR, 1-SO and 2-LR, and so on. Based on both plots, 11 dimensional features (6-LR point on the x-axis) was chosen as the final set, with 63% and 91% head count accuracy for living room and single office environments, respectively.

FIGS. 15 and 16A-16H illustrate a decision tree algorithm determined from the data of the experimental living room scenario. In the flow chart of FIGS. 15-16, the subscript for the X splitting variable is the feature functional number from Table 2 above minus one (i.e. $X_0$ refers to feature 1–Maximum of MFCC1; $X_1$ refers to feature 2–mean of energy; etc.). The "value" array has four values, corresponding to actual (known) head counts of [0, 1, 2, 3] in the experimental living room scenario.

Figure 15:
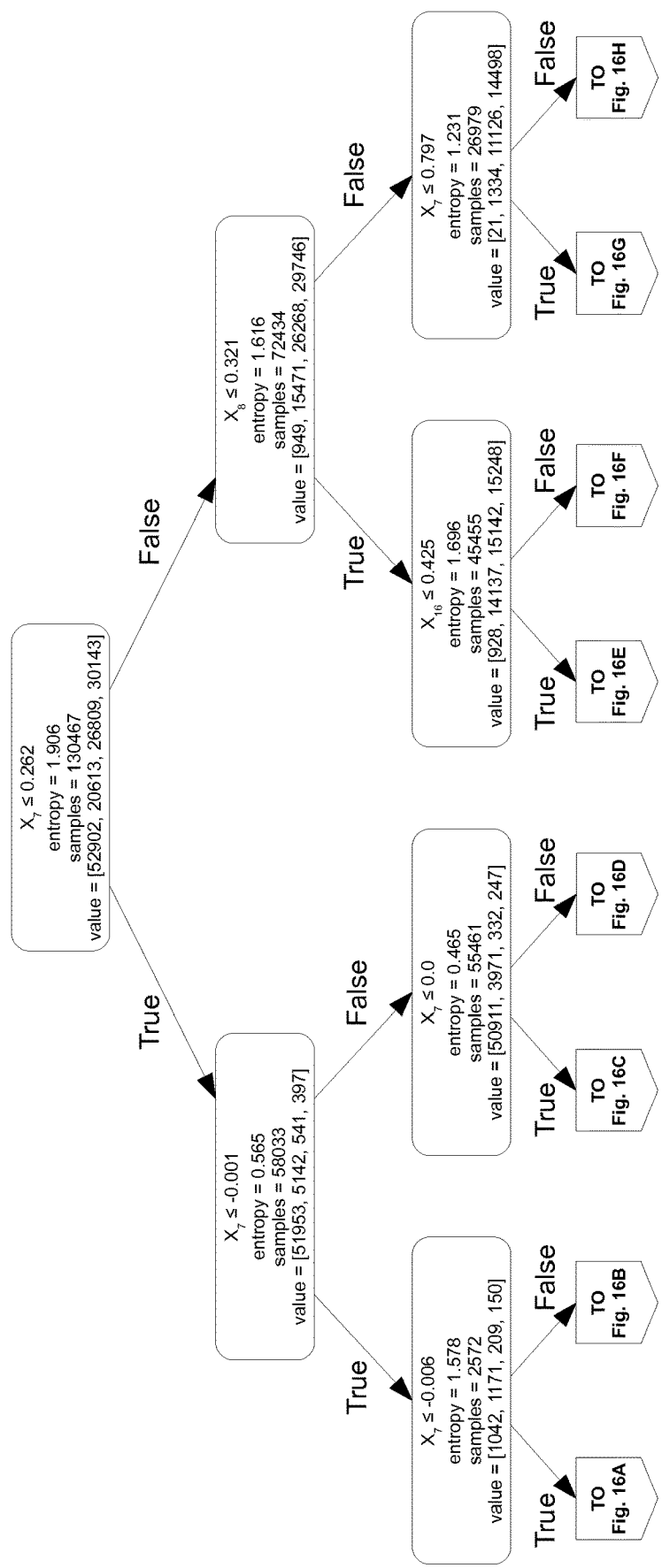
FIG. 15 illustrates a decision tree algorithm determined from the experimental living room scenario.
Figure 16A:
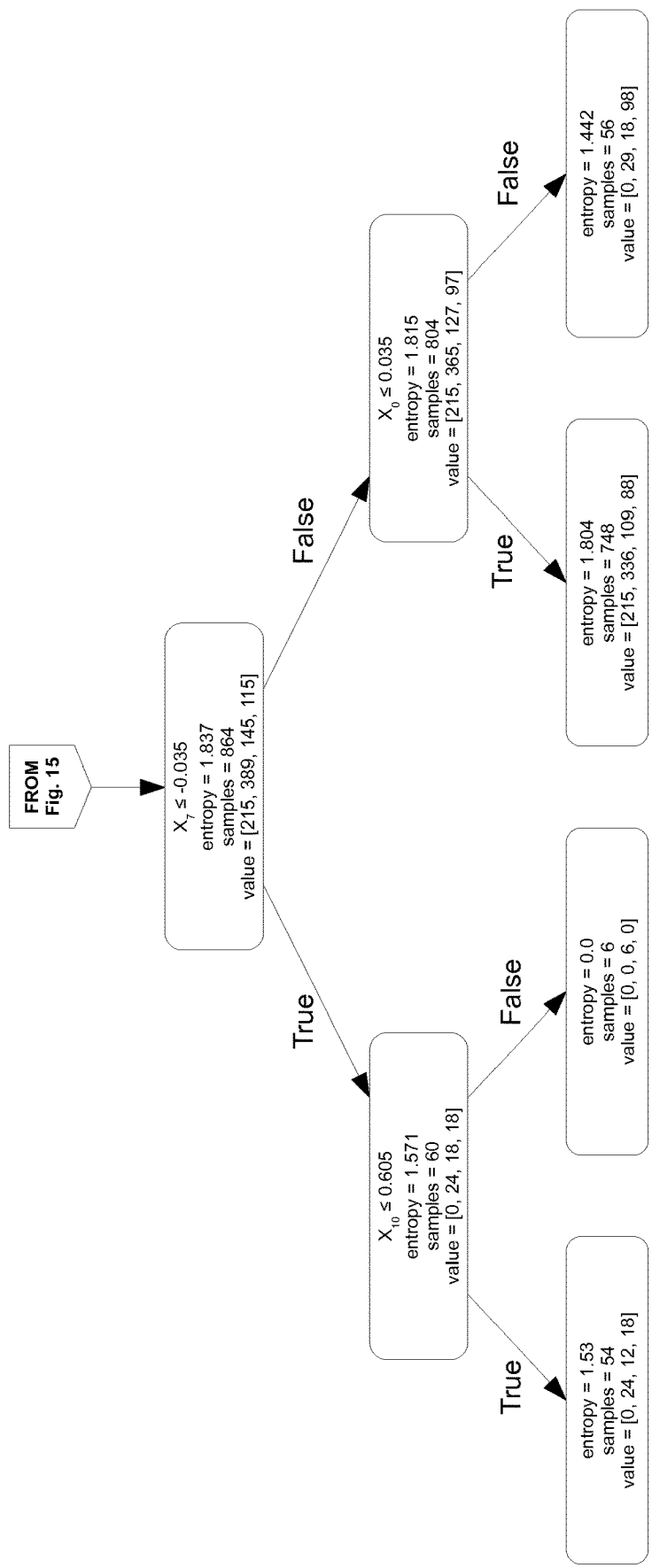
FIG. 16A illustrates a continuation of the decision tree algorithm of FIG. 15.
Figure 16B:
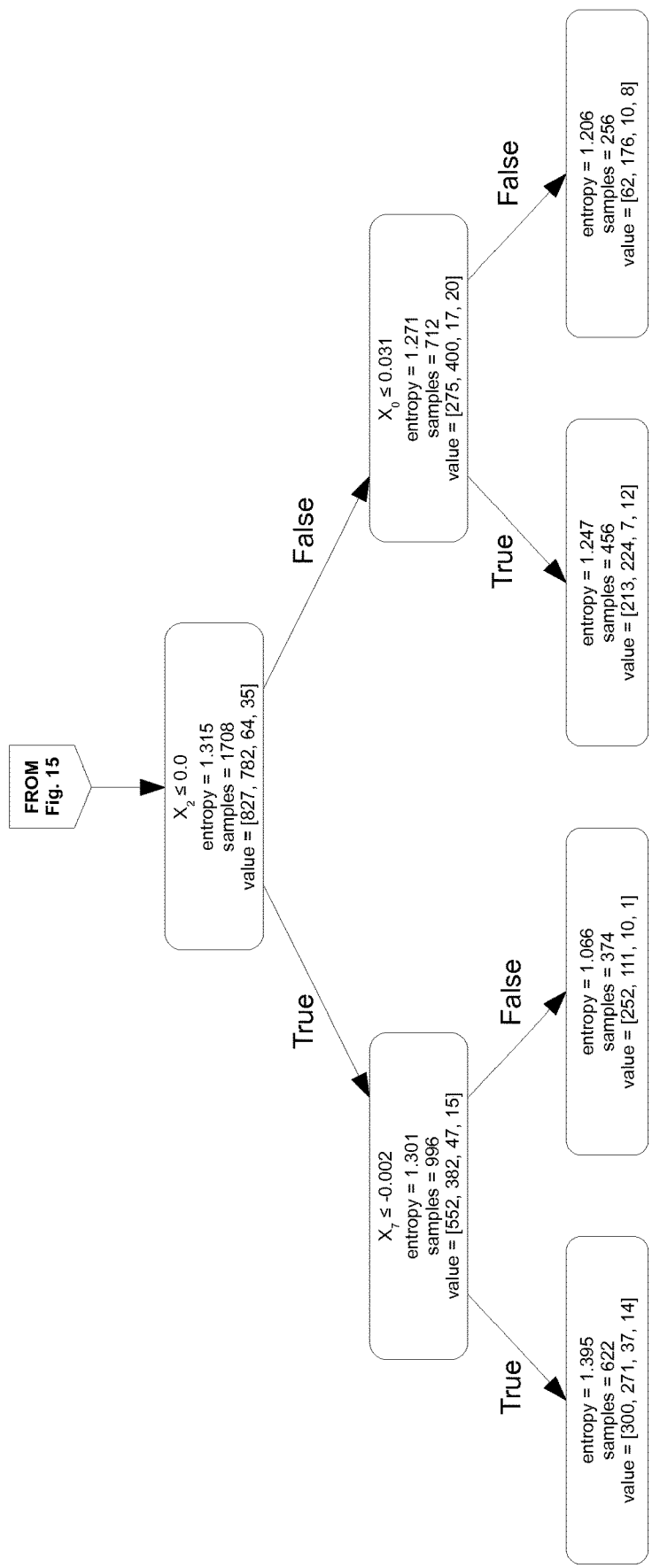
FIG. 16B illustrates a continuation of the decision tree algorithm of FIG. 15.
Figure 16C:
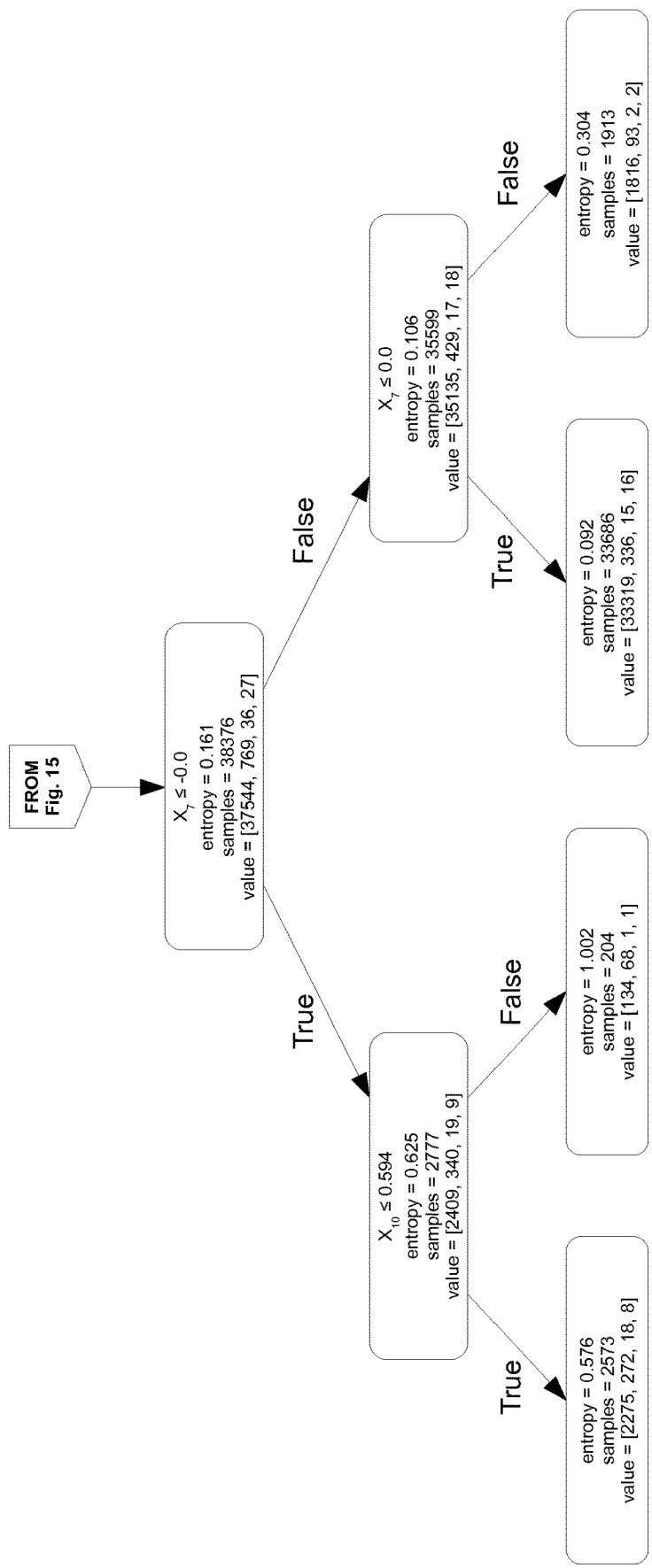
FIG. 16C illustrates a continuation of the decision tree algorithm of FIG. 15.
Figure 16D:
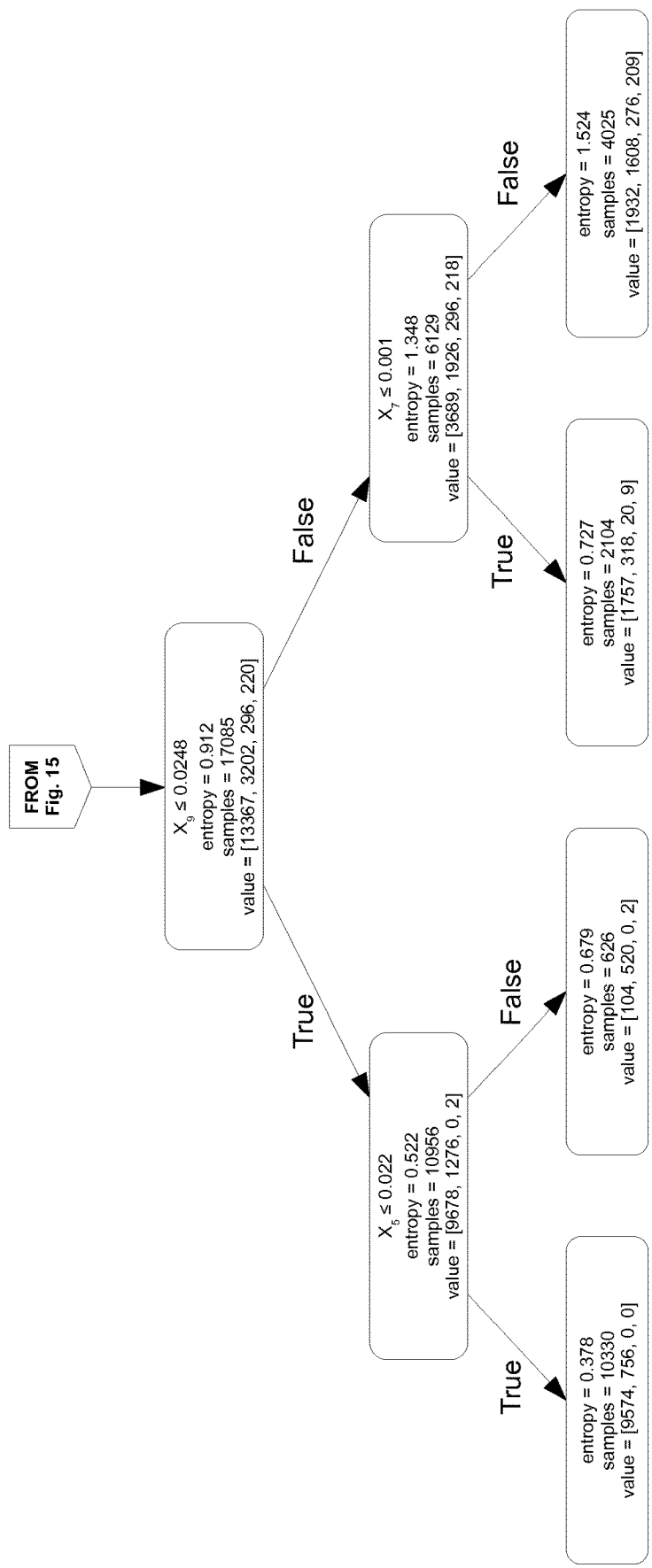
FIG. 16D illustrates a continuation of the decision tree algorithm of FIG. 15.
Figure 16E:
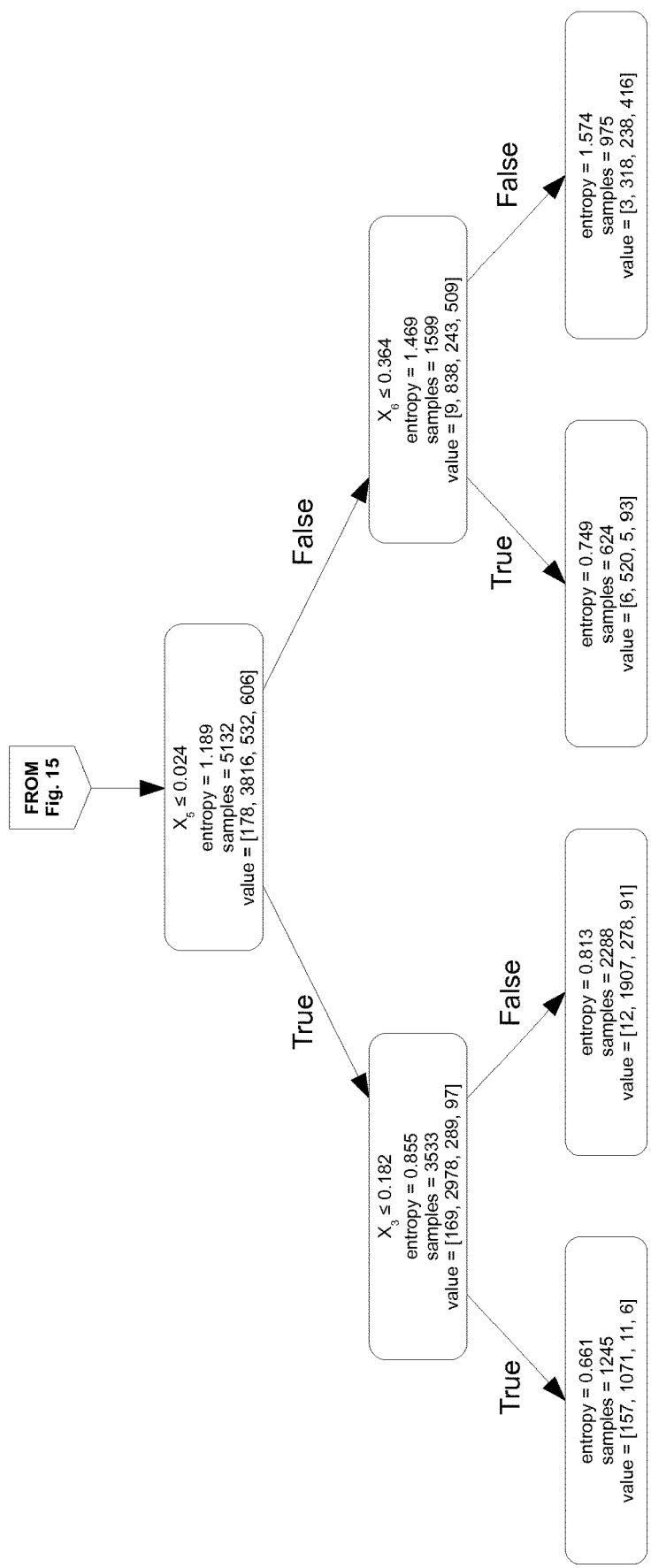
FIG. 16E illustrates a continuation of the decision tree algorithm of FIG. 15.
Figure 16F:
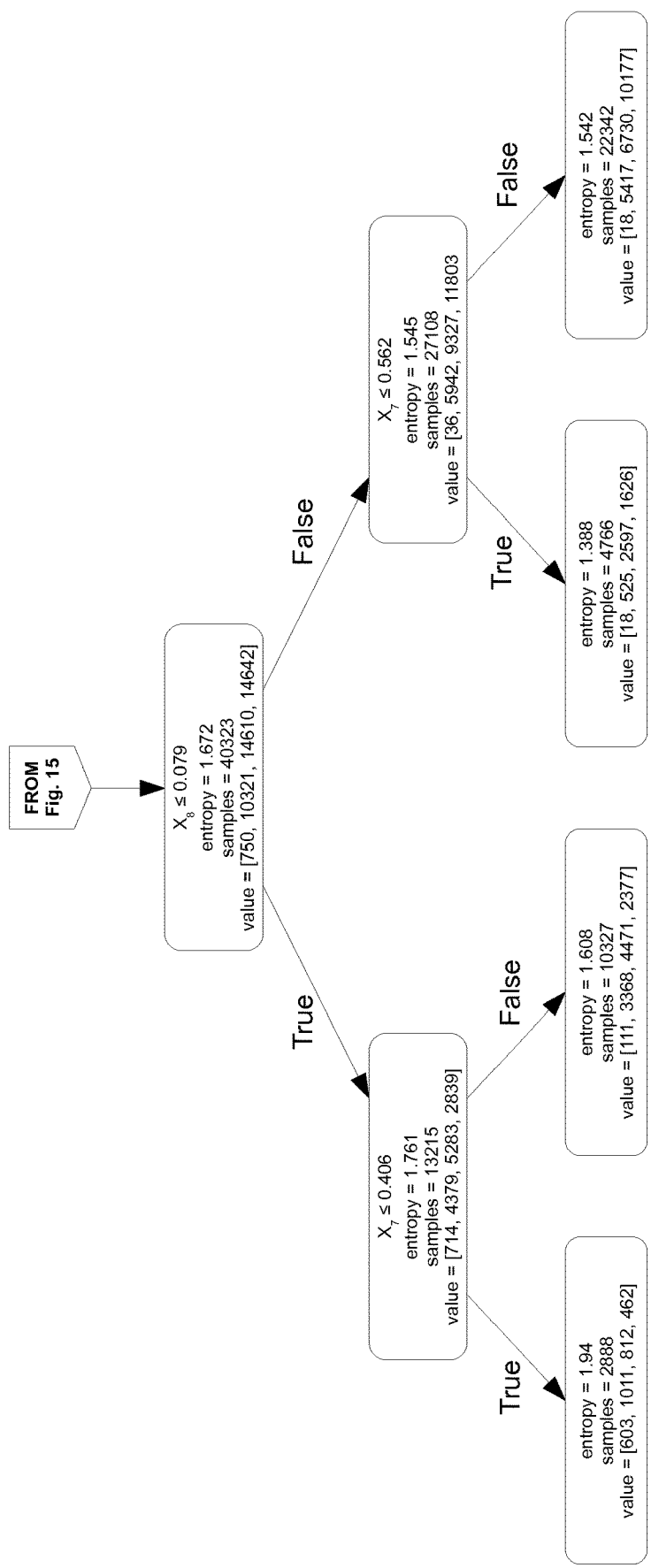
FIG. 16F illustrates a continuation of the decision tree algorithm of FIG. 15.
Figure 16G:
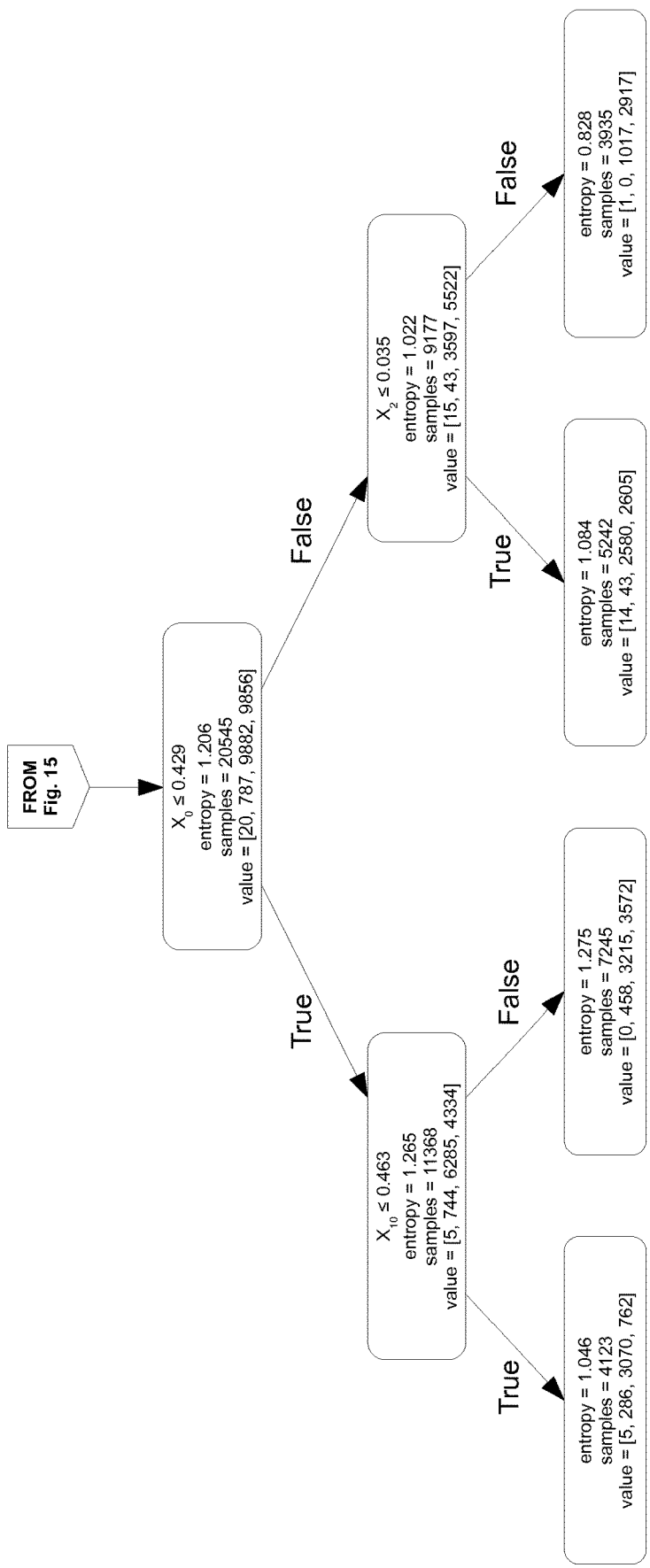
FIG. 16G illustrates a continuation of the decision tree algorithm of FIG. 15.
Figure 16H:
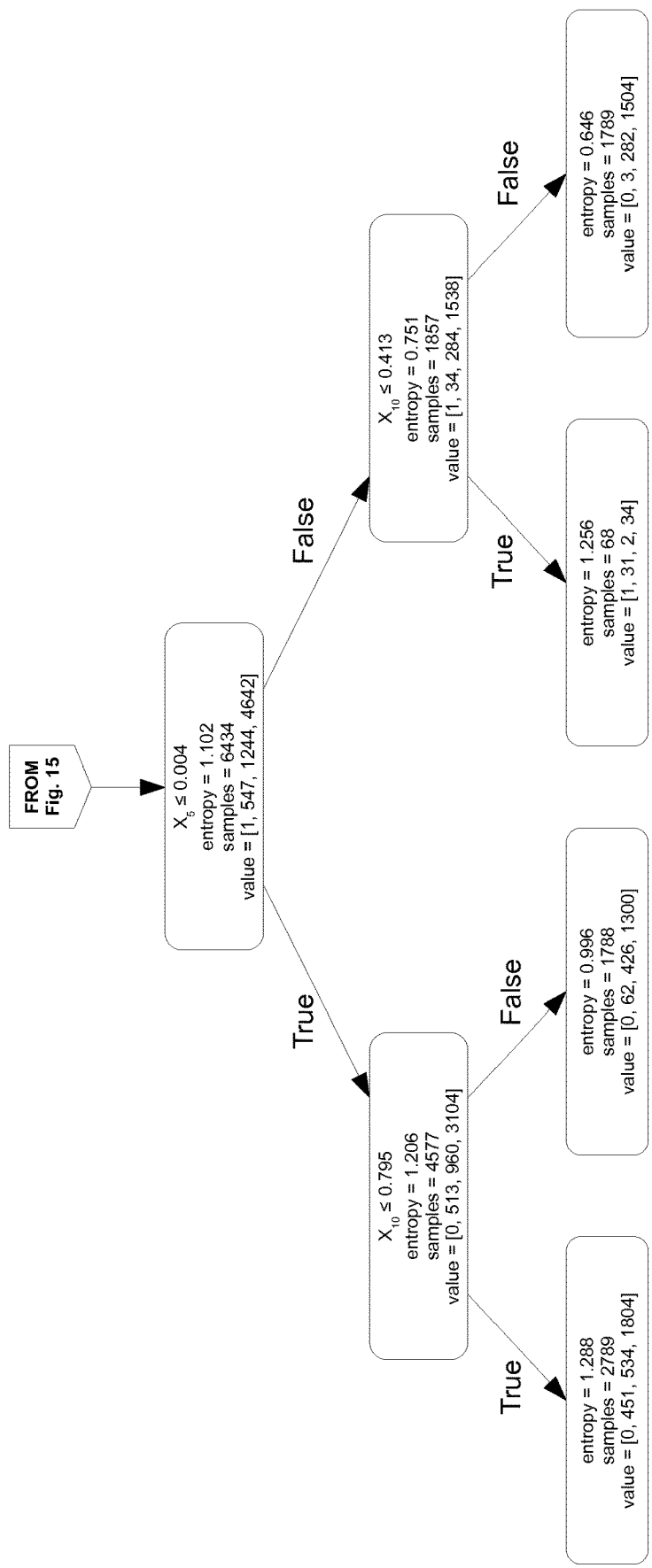
FIG. 16H illustrates a continuation of the decision tree algorithm of FIG. 15.

The reader should appreciate that the decision tree of FIGS. 15 and 16 is an experimental example only. The nodes, leaves, and splits used in other embodiments may vary depending on a number of factors, including the size of the area, usage of the area, selected feature functionals, desired processing power used, desired accuracy, desired use of the head counting data, etc.

Figure 17:
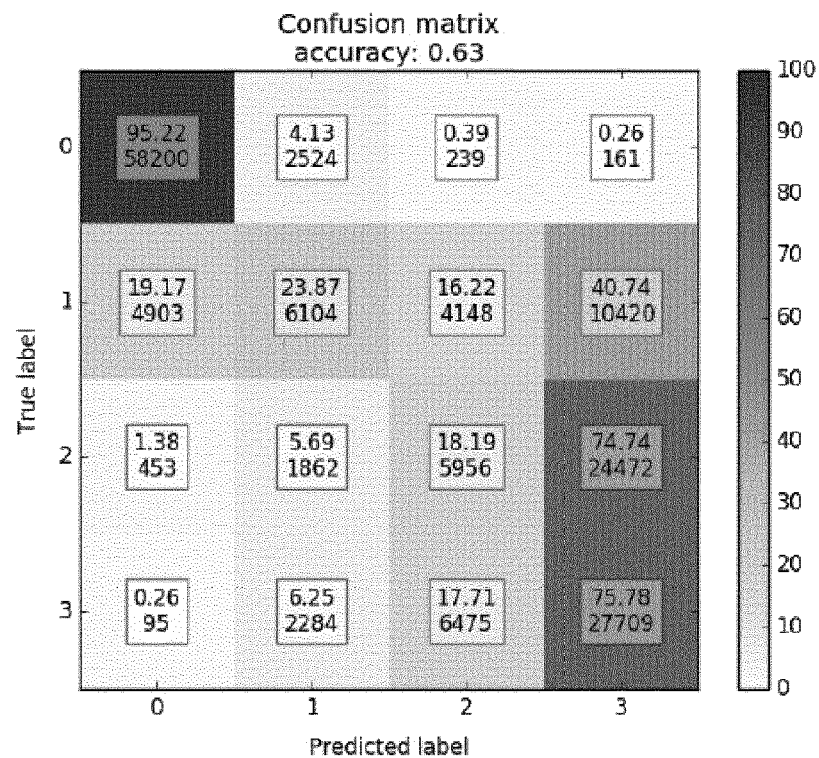
FIG. 17 is a confusion matrix depicting the accuracy of the head counting in the experimental living room scenario using eleven feature functionals from the chart of FIG. 13.
Figure 18:
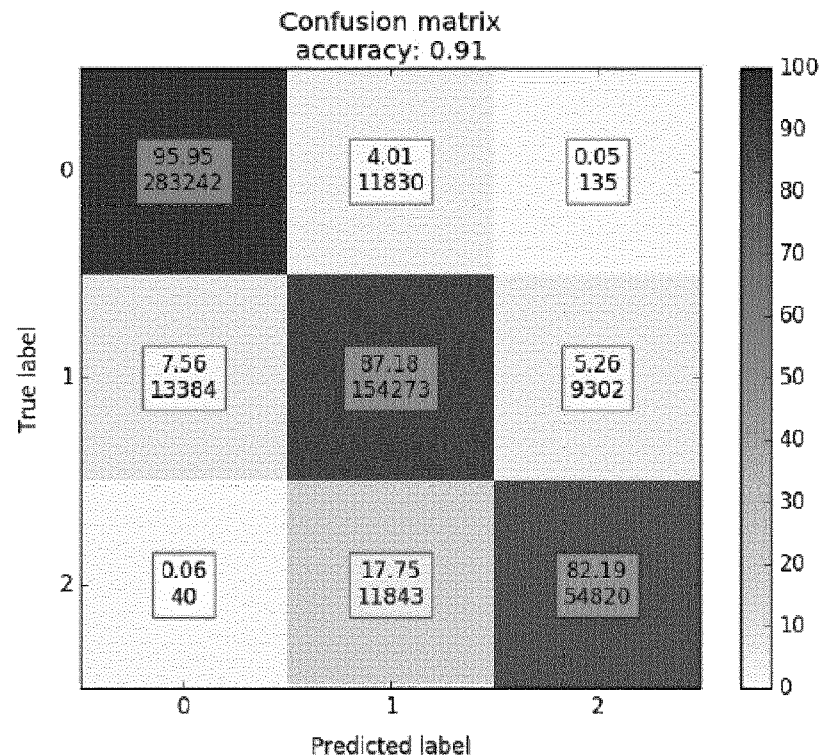
FIG. 18 is a confusion matrix depicting the accuracy of the head counting in the experimental single office scenario using eleven feature functionals from the chart of FIG. 14.

Moreover, as illustrated in FIGS. 17 and 18, confusion matrices of head count task for the two environments were calculated using the 11-dimensional final feature set. As seen in FIGS. 17 and 18, presence detection has a high performance rate using only a single audio signal, with 95% accuracy for living room scenario and 96% accuracy for the single office scenario. As a result, it is evident that an audio sensor can be used confidently as the first step of presence detection. In some instances, additional sensors, for example additional audio sensors, may be used in the calculation once presence is detected to increase the head count accuracy without overly increasing the computational requirements. This way, use of both computational and energy resources can be optimized without sacrificing detection accuracy.

In addition, the overall head count accuracy using only a subset of features provided accurate classification performance, with 63% and 91% classification accuracy for living room and single office environments, respectively. Based on the confusion matrices, performance in single office environment is accurate for 0, 1 and 2 head counts. Thus, the disclosed occupancy detection system, used with the experimental parameters, provides accurate occupancy detection results with reduced cost and computational resource requirements as compared to conventional systems.

Finally, different segment lengths (5, 10, 30, 60, 120, 300, 600 seconds) were extracted to investigate the effects of using different time windows in the feature functional determinations. The experiments suggest that a window length of 30 seconds improves the accuracy in the single office scenario from 91% to 95% for the head counting task and from 96% to 99% for presence detection. In living room scenario, using a time window of 30 seconds improved performance from 63% to 70% for head counting and from 95% to 96% for presence detection. The results illustrate that a longer time window is advantageous for head counting as compared to other audio analytic tasks, such as automated speech recognition ("ASR"), emotion recognition, etc., which use a shorter time window in the range of tens of milliseconds to several seconds.

The system performance on three other environments using the 11-dimension final features and 30 second segments. The system gains 48%, 61% and 81% accuracy in open office (9-way), bedroom (2-way), and meeting room (7-way) environments. These results illustrate that the feature functionals selected from the single office and living room scenarios are also applicable for scenarios outside of the training set. As a result, the disclosed occupancy detection system is accurate for a variety of scenarios using the selected feature functionals and classifier model from the experimental results.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the foregoing disclosure.

The invention claimed is:

1. A method of detecting occupancy in an area comprising:
    selecting a set of selected feature functionals from training data, the selecting of the set of selected feature functionals comprising:
    extracting training data feature functionals from the training data;
    determining correlation between the training data feature functionals and known occupancy of the area; and
    discarding feature functionals of the training data feature functionals that are uncorrelated with the known occupancy to select the set of selected feature functionals;
    obtaining, with a processor, an audio sample from an audio sensor;
    determining, with the processor, feature functional values of the set of selected feature functionals from the audio sample, the determining of the feature functional values comprising:
    extracting features in the set of selected feature functionals from the audio sample; and
    determining the feature functional values of the set of selected feature functionals from the extracted features; and determining, with the processor, occupancy in the area using a decision tree classifier based on the determined feature functional values and the set of selected feature functionals from the training data, wherein the set of selected feature functionals includes at least two selected from the group consisting of: maximum of mel-frequency cepstral coefficient (MFCC)-1; mean of energy; dynamic range of envelope dynamic range; mean of brightness; dynamic range of brightness; median of brightness; entropy of MFCC-4 delta; standard deviation of spectral flux; entropy of MFCC-19; standard deviation of envelope dynamic range; entropy of envelope dynamic range; absolute integral of MFCC-5 delta; entropy of zero crossing rate; absolute integral of brightness; entropy of spectral roll off, entropy of brightness; entropy of spectral flux; entropy of spectral variance; entropy of MFCC-7; entropy of MFCC-2 delta; entropy of MFCC-1 delta-delta; entropy of MFCC-5; entropy of energy; entropy of MFCC-3; and entropy of MFCC-20 delta.

2. The method of claim 1, wherein the decision tree classifier has maximum depth of between 2 and 15.

3. The method of claim 1, wherein the decision tree classifier has a maximum depth of five.

4. The method of claim 1, wherein the set of selected feature functionals includes between 5 and 25 feature functionals.

5. The method of claim 1, wherein the set of selected feature functionals includes between 10 and 20 feature functionals.

6. The method of claim 1, wherein the set of selected feature functionals includes 11 feature functionals.

7. The method of claim 1, wherein the features include one or more of envelope dynamic range, zero crossing rate, energy, brightness, spectral variance, spectral roll off, spectral flux, at least one MFCC coefficient, a delta of at least one MFCC coefficient, and a delta-delta of at least one MFCC coefficient.

8. The method of claim 7, wherein the set of selected feature functionals include at least one of the group consisting of: mean, median, standard deviation, absolute integral, minimum, maximum, dynamic range, dominant-frequency, and entropy, determined for each of the features.

9. The method of claim 1, wherein the set of selected feature functionals includes at least two selected from the group consisting of: maximum MFCC-1; mean energy; dynamic range of envelope dynamic range; mean of brightness; dynamic range of brightness; median of brightness; entropy of MFCC-4 delta; standard deviation of spectral flux; entropy of MFCC-19; standard deviation of envelope dynamic range; entropy of envelope dynamic range.

10. The method of claim 1, wherein the set of selected feature functionals and the decision tree classifier are learned in a machine-learning training process.

11. The method of claim 1, wherein the determining of the feature functional values further comprises segmenting the extracted features.

12. The method of claim 1, wherein the selecting of the set of selected feature functionals further comprises:
determining correlation between feature functionals of the training data feature functionals; and
discarding one or more feature functionals of the training data feature functionals that is correlated with another one of the feature functionals of the training data feature functionals.

13. A system for determining occupancy in an area comprising:

at least one audio sensor configured to record an audio sample in the area;
a processor configured to execute programmed instructions stored in a memory to:
select a set of selected feature functionals from training data, the selecting of the set of selected feature functionals comprising:
extracting training data feature functionals from the training data;
determining correlation between the training data feature functionals and known occupancy of the area; and
discarding feature functionals of the training data feature functionals that are uncorrelated with the known occupancy to select the set of selected feature functionals;
obtain the audio sample from the audio sensor;
determine feature functional values of the set of selected feature functionals from the audio sample, the determining of the feature functional values comprising:
extracting features in the set of selected feature functionals from the audio sample; and
determining the feature functional values of the set of selected feature functionals from the extracted features; and
determine occupancy in the area using a decision tree classifier based on the determined feature functional values and the set of selected feature functionals from the training data,
wherein the set of selected feature functionals includes at least two selected from the group consisting of: maximum of mel-frequency cepstral coefficient (MFCC)-1; mean of energy; dynamic range of envelope dynamic range; mean of brightness; dynamic range of brightness; median of brightness; entropy of MFCC-4 delta; standard deviation of spectral flux; entropy of MFCC-19; standard deviation of envelope dynamic range; entropy of envelope dynamic range; absolute integral of MFCC-5 delta; entropy of zero crossing rate; absolute integral of brightness; entropy of spectral roll off, entropy of brightness; entropy of spectral flux; entropy of spectral variance; entropy of MFCC-7; entropy of MFCC-2 delta; entropy of MFCC-1 delta-delta; entropy of MFCC-5; entropy of energy; entropy of MFCC-3; and entropy of MFCC-20 delta.

14. The system of claim 13, wherein the decision tree classifier has maximum depth of between 2 and 15.

15. The system of claim 13, wherein the set of selected feature functionals includes between 10 and 20 feature functionals.

16. The system of claim 13, wherein:
the features include one or more of envelope dynamic range, zero crossing rate, energy, brightness, spectral variance, spectral roll off, spectral flux, at least one MFCC coefficient, a delta of at least one MFCC coefficient, and a delta-delta of at least one MFCC coefficient; and
the set of selected feature functionals include at least one of the group consisting of: mean, median, standard deviation, absolute integral, minimum, maximum, dynamic range, dominant-frequency, and entropy, determined for each of the features.

17. The system of claim 13, wherein the processor is further configured to, in the selecting of the set of selected feature functionals:
determine correlation between feature functionals of the training data feature functionals; and discard one or more feature functionals of the training data feature functionals that is correlated with another one of the feature functionals of the training data feature functionals.

\* \* \* \* \*